United States Patent [19]

Urababa et al.

[11] Patent Number: 4,897,776

[45] Date of Patent: Jan. 30, 1990

[54] ELECTRONIC CONTROLLED FLUID SUSPENSION SYSTEM FOR CONTROLLING ROLL AND PITCH OF A VEHICLE BODY

[75] Inventors: Shingo Urababa; Shuuichi Buma; Toshio Aburaya, all of Toyota; Takashi Yonekawa, Mishima; Osamu Takeda, Susono; Shunichi Doi, Nagoya, all of Japan

[73] Assignee: Toyota Jidosha Kabushiki Kaisha, Aichi, Japan

[21] Appl. No.: 240,134

[22] Filed: Sep. 2, 1988

[30] Foreign Application Priority Data

Sep. 4, 1987 [JP] Japan .............................. 62-135883[U]
Sep. 4, 1987 [JP] Japan .............................. 62-135885[U]
Jul. 28, 1988 [JP] Japan .............................. 62-100380[U]
Jul. 28, 1988 [JP] Japan .................................. 63-188874

[51] Int. Cl.$^4$ ............................................. B60G 17/00
[52] U.S. Cl. ................................ 364/424.05; 280/707; 280/703
[58] Field of Search ................... 364/424.05; 280/703, 280/707, 772, 840

[56] References Cited

U.S. PATENT DOCUMENTS 4,749,210  6/1988  Sugasawa et al. ................... 280/707
4,765,649  8/1988  Ikemoto et al. ...................... 280/707
4,770,438  9/1988  Sugasawa et al. .............. 364/424.05
4,787,649  11/1988 Watanabe et al. ................... 280/707

FOREIGN PATENT DOCUMENTS 8402886  8/1984  Int'l Pat. Institute .
57-126705  8/1982  Japan .
60-500662  5/1985  Japan .
61-193907  8/1986  Japan .

Primary Examiner—Gary Chin
Attorney, Agent, or Firm—Oliff & Berridge

[57] ABSTRACT

In controlling roll and pitch of a vehicle body responsive to a displacement signal produced at each wheel of the vehicle, each signal is low-pass-filtered with a certain threshold frequency to prevent hunting of the control due to an excessively high frequency component (such as noise or a component corresponding to road irregularities) of the signal. According to this invention, the threshold frequency is changed to a higher value in order to get quick attitude control when the roll or pitch of the body is expected, while it is set at a lower value when no such attitude change is expected in order to prevent hunting of the control.

6 Claims, 27 Drawing Sheets

ELECTRONIC CONTROLLED FLUID SUSPENSION SYSTEM FOR CONTROLLING ROLL AND PITCH OF A VEHICLE BODY

BACKGROUND OF THE INVENTION

This invention relates to an electronic controlled fluid suspension system for a vehicle and especially to a controller for the suspension system for controlling roll and pitch of the vehicle body.

Various suspension systems and controllers have been proposed so far in which displacements of suspensions of a vehicle are totally controlled in order to improve riding comfort and maneuverability. In one of those prior art suspension systems, such as disclosed in an international publication WO 84/02886 (PCT/GB 84/00014), displacements of suspensions sensed by appropriate sensors are converted into displacements representing a change in the attitude of the body, i.e., vertical translational displacement, roll displacement, pitch displacement and warp displacement. Based on the displacements of various modes of body attitude change, the suspensions are controlled to stabilize the body attitude.

Such suspension control has a quick response to any attitude change caused by turning, braking and accelerating, but has a drawback in some cases. When the vehicle runs on a rough road, the controller may cause hunting by picking up high-frequency displacement changes of the suspensions corresponding to the profile of the road because of rather low responsiveness of the controller. One measure to prevent the hunting is to provide a low-pass filter between the displacement sensor at the suspension and the controller in order to eliminate the high-frequency component of the sensor signal. But this measure has still another drawback: the characteristic of the attitude control depends on the threshold frequency of the low-pass filter. Namely, the merit of the quick responsiveness of the attitude control may be sacrificed by the low-pass filter.

SUMMARY OF THE INVENTION

An object of the invention is to provide a suspension system for controlling vehicle attitude which has quick response to attitude change, while is free from hunting due to road irregularities.

Another object of the invention is to make the suspension system safe against abnormal sensor signals.

These and other objects of the invention are achieved by an electronic controlled fluid suspension system including, as shown in FIG. 1, the following elements: a fluid suspension SUS provided for each of a plurality of wheels WH of the vehicle; a height detection means M1 provided for each of the plurality of wheels WH for detecting a height of a body of the vehicle at said each wheel and for generating a height signal; a roll detection means M2 responsive to the height signals for generating a roll signal representing roll of the body; a low-pass filtering means M3 for passing only a component of the roll signal that is lower than a threshold frequency; a driving state detection means M4 for detecting driving parameters that affect the lateral acceleration of the body; a threshold changing means M5 responsive to the detected driving parameters for changing the threshold frequency of the low-pass filtering means M3 to a higher value when the body is expected to develop a roll; a target determination means M6 for determining a target roll signal; an attitude control means M7 for generating a control amount in order to feedback-control the roll signal filtered by the low-pass filtering means M3 to approach the target roll signal; and a fluid flow control means M8 responsive to the control amount for controlling fluid flow to and from each of the fluid suspensions SUS.

This invention is not limited to a suspension system for controlling the roll of the body, but can be applied quite similarly to controlling the pitch of the body.

Under normal driving conditions, the signals from the roll (pitch) detection means M2 are filtered by a relatively low threshold frequency, whereby hunting due to road irregularities is prevented. When, based upon the driving parameters, roll (or pitch) of the body is expected, the threshold frequency is changed to a higher value, whereby the system can cope with the attitude change quickly.

BRIEF DESCRIPTION OF THE DRAWINGS

By way of example and to make the description clearer, reference is made to the accompanying drawings in which.

DETAILED DESCRIPTION OF PREFERRED EMBODIMENTS

Set forth is the explanation of an embodiment of the present invention based on the attached drawings.

Figure 1:
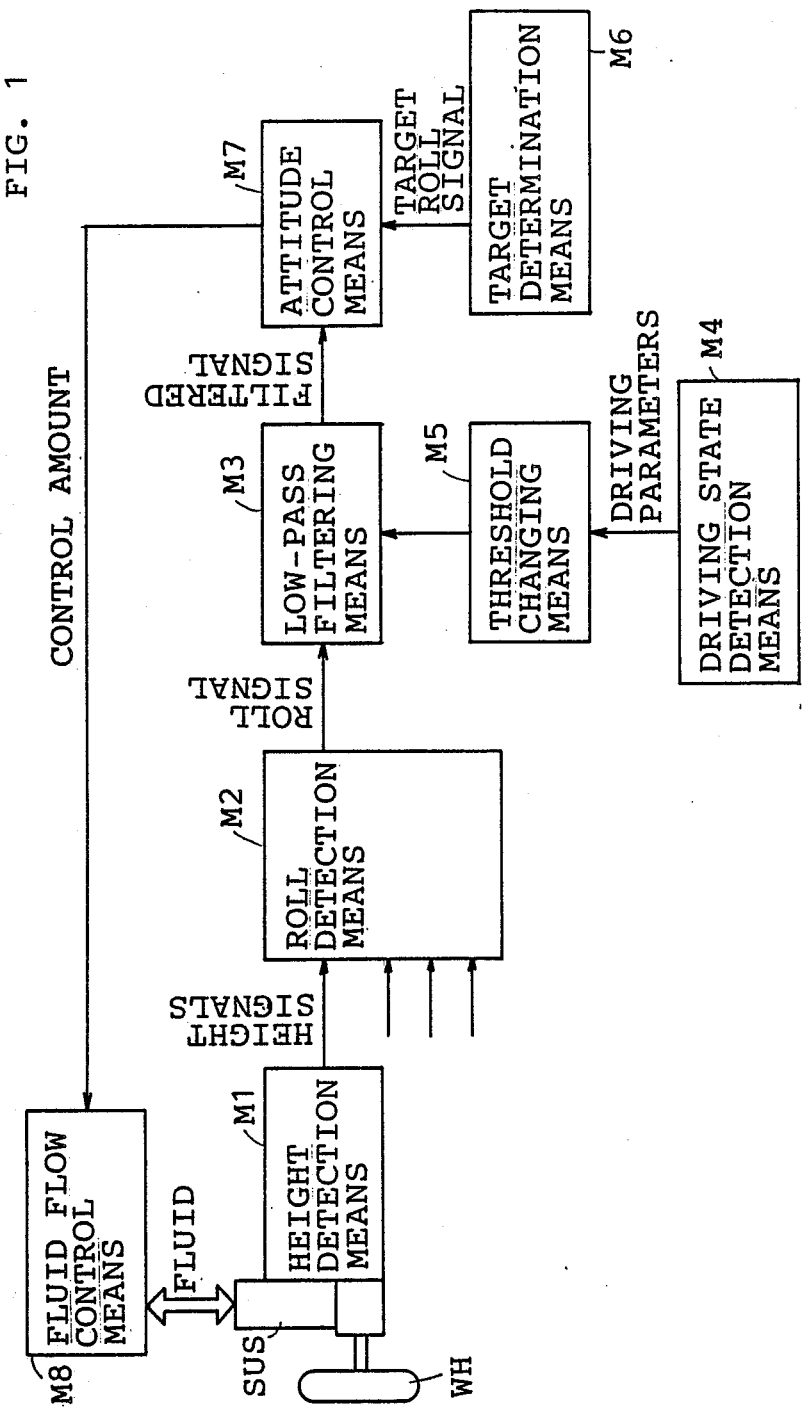
FIG. 1 is a block diagram indicating a fundamental structure of the present invention.
Figure 2:
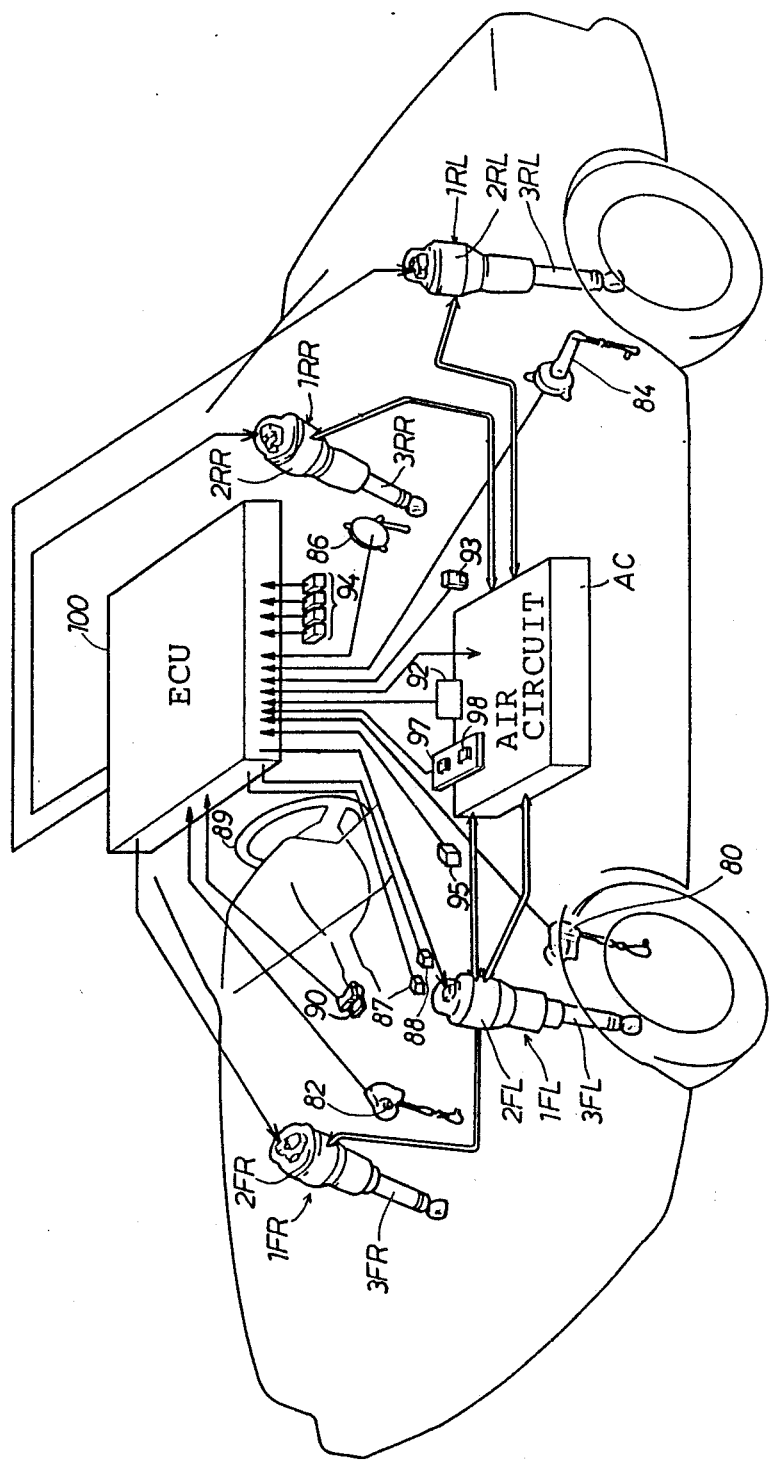
FIG. 2 is a schematic view of an electronic controlled air suspension system according to an embodiment of the present invention.
Figure 3:
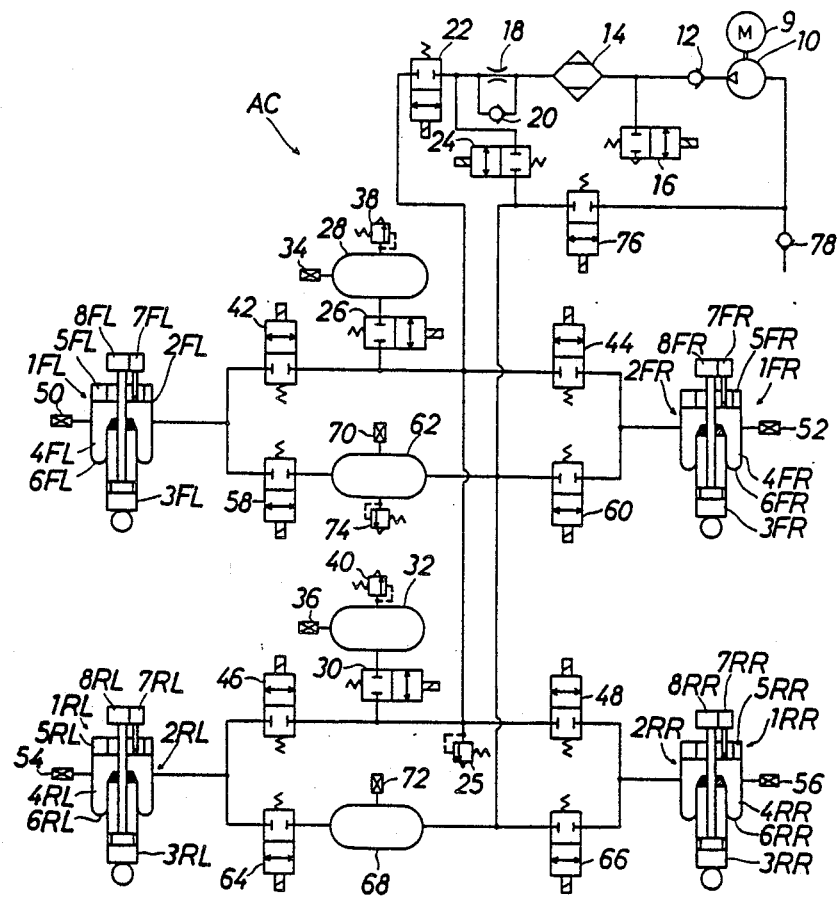
FIG. 3 is an air circuit diagram of the embodiment.

As shown in FIGS. 2 and 3, the electronic controlled air suspension system of the present embodiment is equipped with a front left suspension 1FL, a front right suspension 1FR, a rear left suspension 1RL and a rear right suspension 1RR, all of which are connected to an air circuit AC. These suspensions 1FL, 1FR, 1RL and 1RR are equipped with air springs 2FL, 2FR, 2RL and 2RR and shock absorbers 3FL, 3FR, 3RL and 3RR, respectively.

The air springs FL, 2FR, 2RL and 2RR are equipped with main air chambers 4FL, 4FR, 4RL and 4RR and auxiliary air chambers 5FL, 5FR, 5RL and 5RR, respectively. The main air chambers 4FL, 4FR, 4RL and 4RR are partially formed of diaphragms 6FL, 6FR, 6RL and 6RR so that the height of the vehicle can be changed by supplying and discharging air to and from the main air chambers 4FL, 4FR,4RL and 4RR. The air springs 2FL, 2FR, 2RL and 2RR can have their spring constants changed to "low", "medium" and "high" states by energizing spring actuators 7FL, 7FR, 7RL and 7RR to either provide/block communications between the main air chambers 4FL, 4FR, 4RL and 4RR and the auxiliary air chambers 5FL, 5FR, 5RL and 5RR or to adjust the air flow rates. The shock absorbers 3FL, 3FR, 3RL and 3RR can have their damping force changed to "low", "medium" and "high" by energizing absorber actuators 8FL, 8FR, 8RL and 8RR to control the flow rate of working fluid passing through orifices (not shown).

The air circuit AC is equipped with a compressor 10 which is driven by a motor 9 so that it may act as a compressed air supply source for the air springs 2FL, 2FR, 2RL and 2RR. The compressor 10 has its discharge side connected to an air drier 14 and a discharge valve 16 through a check valve 12 for preventing back flow. Silica gel is provided in the air drier 14 to remove moisture from the compressed air. This air drier 14 is connected to one side of a supply valve 22 and a change-over valve 24 through a fixed throttle 18 and a check valve 20 for preventing back flow. The other side of the supply valve 22 is connected to a relief valve 25 set at a predetermined pressure, and through a high pressure reservoir valve 26 to a front high pressure reserve tank 28, and through another high pressure reservoir valve 30 to a rear high pressure reserve tank 32. The high pressure reserve tanks 28 and 32 are respectively equipped with pressure sensors 34 and 36 for detecting the air pressures therein and relief valves 38 and 40 set at a predetermined pressure.

The above-mentioned side of the supply valve 22 is further connected through a leveling valve 42 to the main air chamber 4FL, through a leveling valve 44 to the main air chamber 4FR, through a leveling valve 46 to the main air chamber 4RL, and through a leveling valve 48 to the main air chamber 4RR. Connected to these main air chambers 4FL, 4FR, 4RL and 4RR, respectively, are pressure sensors 50, 52, 54 and 56 for detecting the air pressures.

The main air chamber 4FL at the front left side and the main air chamber 4FR at the front right side are connected to a front low pressure reserve tank 62 through discharge valves 58 and 60. The main air chamber 4RL at the rear left side and the main air chamber 4RR at the rear right side are connected to a rear low pressure reserve tank 68 through discharge valves 64 and 66. Moreover, the front low pressure reserve tank 62 and the rear low pressure reserve tank 68 are connected to inter-communicate at all times. Connected to these low pressure reserve tanks 62 and 68, respectively, are pressure sensors 70 and 72 for detecting the air pressures therein. Connected to the front low pressure reserve tank 62, is a relief valve 74 which is set at a predetermined pressure.

These two low pressure reserve tanks 62 and 68 are connected to the other side of the aforementioned change-over valve 24 and further to the suction side of the compressor 10 through a suction valve 76. To the suction side of the compressor 10, there is connected a check valve 78 for intaking external air.

The present embodiment is otherwise practicable without the check valve 78 by making a closed gas circuit which is filled with air or other gas, e.g., nitrogen gas.

The aforementioned discharge valve 16, supply valve 22, change-over valve 24, high pressure reservoir valves 26 and 30, leveling valves 42, 44, 46 and 48, discharge valves 58, 60, 64 and 66, and suction valve 76 are electromagnetic valves of normally closed, two-position type in the present embodiment.

The present air circuit AC is equipped at its front side and rear side with two high pressure reserve tanks 28 and 32 and two low pressure reserve tanks 62 and 68. It is also possible to provide a common high pressure reserve tank and a common low pressure reserve tank.

As shown in FIG. 2, in the suspension system of the present embodiment, there are provided: a height sensor 80 for detecting the distance between the left front wheel and the vehicle body, i.e., the left front height; a height sensor 82 for detecting the right front height; a height sensor 84 for detecting the left rear height; and a height sensor 86 for detecting the right rear height. These vehicle height sensors 80, 82, 84 and 86 output signals corresponding to a difference between a detected vehicle height and a predetermined standard vehicle height. When the detected vehicle height is larger than the standard height, a positive signal corresponding to the difference is output. For a height equal to the standard height, a zero signal is output. For a height smaller than the standard height, a negative signal corresponding to the difference is output.

There are also provided: a brake switch 87 for detecting an operation of a brake pedal; a throttle sensor 88 for detecting an opening of a throttle valve of the internal combustion engine (not shown); a known steering angle sensor 90 for detecting a steering angle of a steering wheel 89; an acceleration sensor 92 for detecting the longitudinal and lateral accelerations of the vehicle body; a speed sensor 93 for detecting a vehicle speed based on a rotational speed of the output shaft of a transmission (not shown); a door switch 94 provided for each door to detect the closed condition of the door; a neutral switch 95 for sensing that the transmission is in the neutral position; and high and low level switches 97 and 98 which are manually operated to select the vehicle height.

Figure 4:
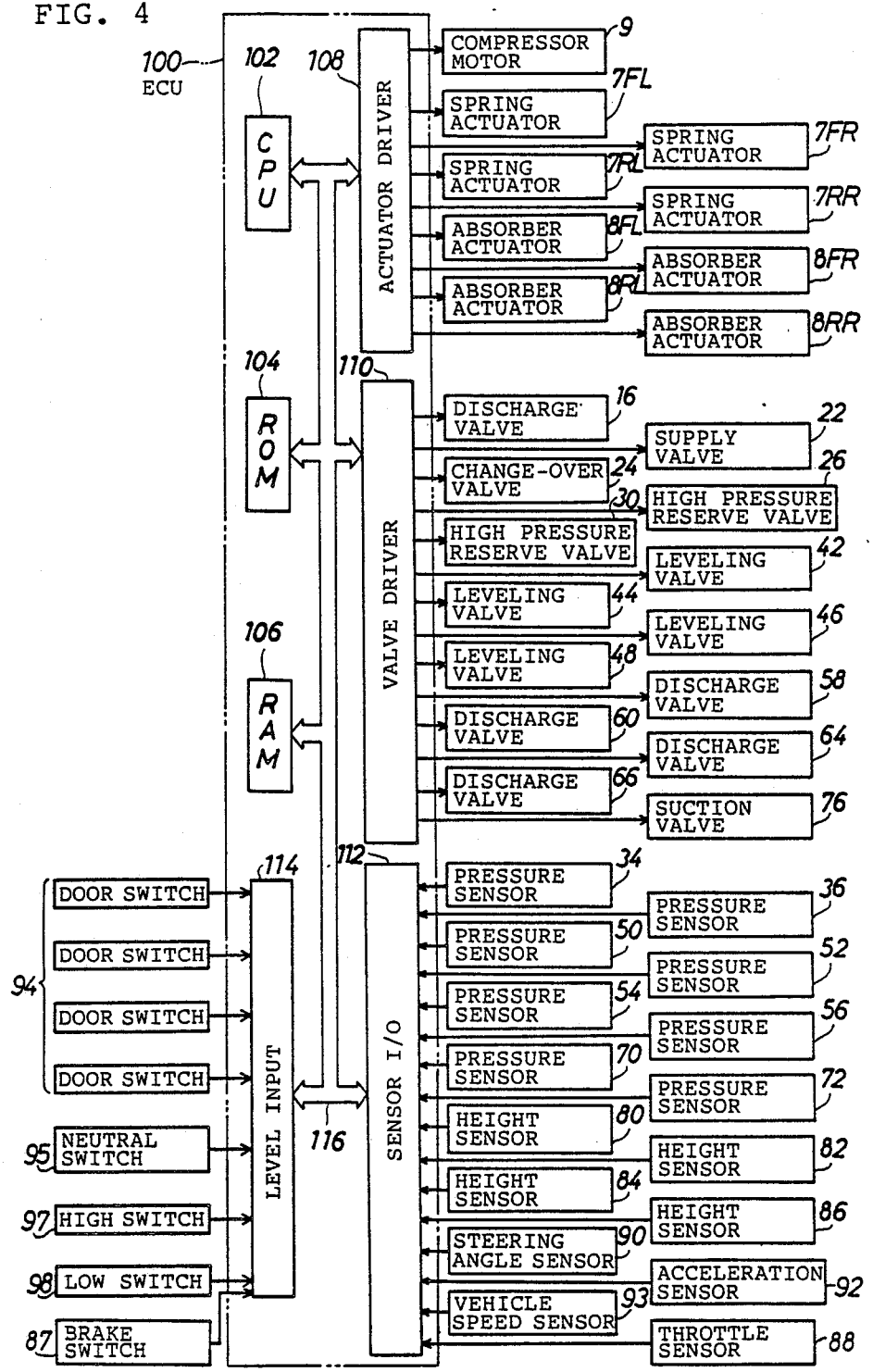
FIG. 4 is a block diagram indicating the constitution of an electric system according to the embodiment.

The electrical system of the present embodiment will be described with reference to the block diagram shown in FIG. 4. The aforementioned individual air suspensions 1FL, 1FR, 1RL and 1RR are driven and controlled by an electronic control unit (ECU) 100 to control the attitude of the vehicle. The ECU 100 is constructed as a logical arithmetic circuit and includes, as shown in FIG. 4, known CPU 102, ROM 104 and RAM 106. The CPU 102, ROM 104 and RAM 106 are mutually connected with input/output circuits, such as an actuator driver 108, a valve driver 110, a sensor input circuit 112 and a level input circuit 114 by way of a common bus 116.

The CPU 102 receives signals from the pressure sensors 34, 36, 50, 52, 54, 56, 70 and 72, the height sensors 80, 82, 84 and 86, the throttle sensor 88, the steering angle sensor 90, the acceleration sensor 92 and the speed sensor 93 by way of the sensor input circuit 112, and the signals from the door switch 94, the neutral switch 95 and the high and low level switches 97 and 98 by way of the level input circuit 114. In response to these signals and the data in the ROM 104 and the RAM 106, the CPU 102 controls the individual air suspensions 1FL, 1FR, 1RL and 1RR by outputting drive signals to the compressor motor 9, the spring actuators 7FL, 7FR, 7RL and 7RR and the absorber actuators 8FL, 8FR, 8RL and 8RR through the actuator driver 108 and by outputting drive signals through the valve driver 110 to the discharge valve 16, the supply valve 22, the change-over valve 24, the high pressure reservoir valves 26 and 30, the leveling valves 42, 44, 46 and 48, the discharge valves 58, 60, 64 and 66 and the suction valve 76. The ROM 104 stores maps shown in FIGS. 10 through 21 and FIGS. 23 through 28.

Figure 5:
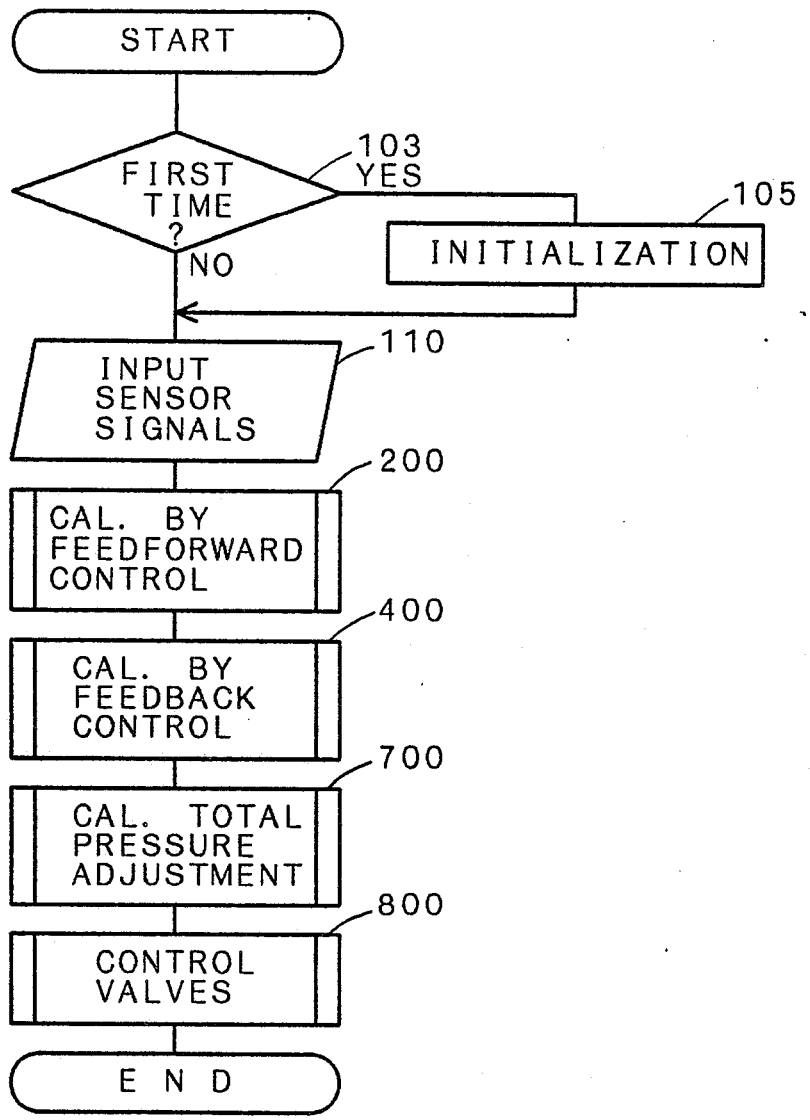
FIG. 5 is a general flowchart of a control routine executed in an electronic control unit of the embodiment.

Various calculations and control processes executed in the ECU 100 are explained with reference to the flowcharts of FIGS. 5 through 9B. FIG. 5 is a general flowchart for indicating an example of an air suspension control according to present invention. FIGS. 6 through 9B are flowcharts detailing the steps shown in the flowchart of FIG. 5.

The process routine of FIG. 5 is repeatedly executed in a predetermined cycle (e.g., 8 msec). When the process routine is started, it is determined at step 103 whether or not this program is executed for the first time. If YES, the program proceeds to step 105 at which initialization of various flags and variables is executed. Subsequently, at step 110, signals output from the above-mentioned various sensors are input.

At step 200, a feedforward control is executed as the advance control for coping with a roll of the body. In the feedforward control, a lateral acceleration GRLM is expected which will develop on the vehicle body after the steering wheel is operated. In response to the expected lateral acceleration GRLM, the control amounts (pressures) of the air springs 2FL, 2FR, 2RL and 2RR are calculated so that the roll is prevented or adjusted at a predetermined small angle.

At step 400, a feedback control is executed as one of the vehicle attitude controls for coping with the roll. In the feedback control, the control amounts (pressures) of the air springs 2FL, 2FR, 2RL and 2RR are calculated to stabilize the vehicle attitude under the condition that the acceleration of the vehicle is not changing greatly.

At step 700, total pressure adjustments for the wheels are calculated. Namely, the sum of pressure adjusting amounts obtained in the feedforward control and feedback control are calculated as the total pressure adjustment.

At step 800, a valve control is executed for opening/closing appropriate valves among the high pressure reservoir valves 26 and 30, the leveling valves 42, 44, 46 and 48 and the discharge valves 58, 60, 64 and 66 based on the total pressure adjustment calculated at step 700.

The feedforward control, feedback control, calculation of the total pressure adjustment and the valve control are respectively explained in detail with reference to the flowcharts of FIGS. 6, 7, 8, 9A and 9B.

Figure 6:
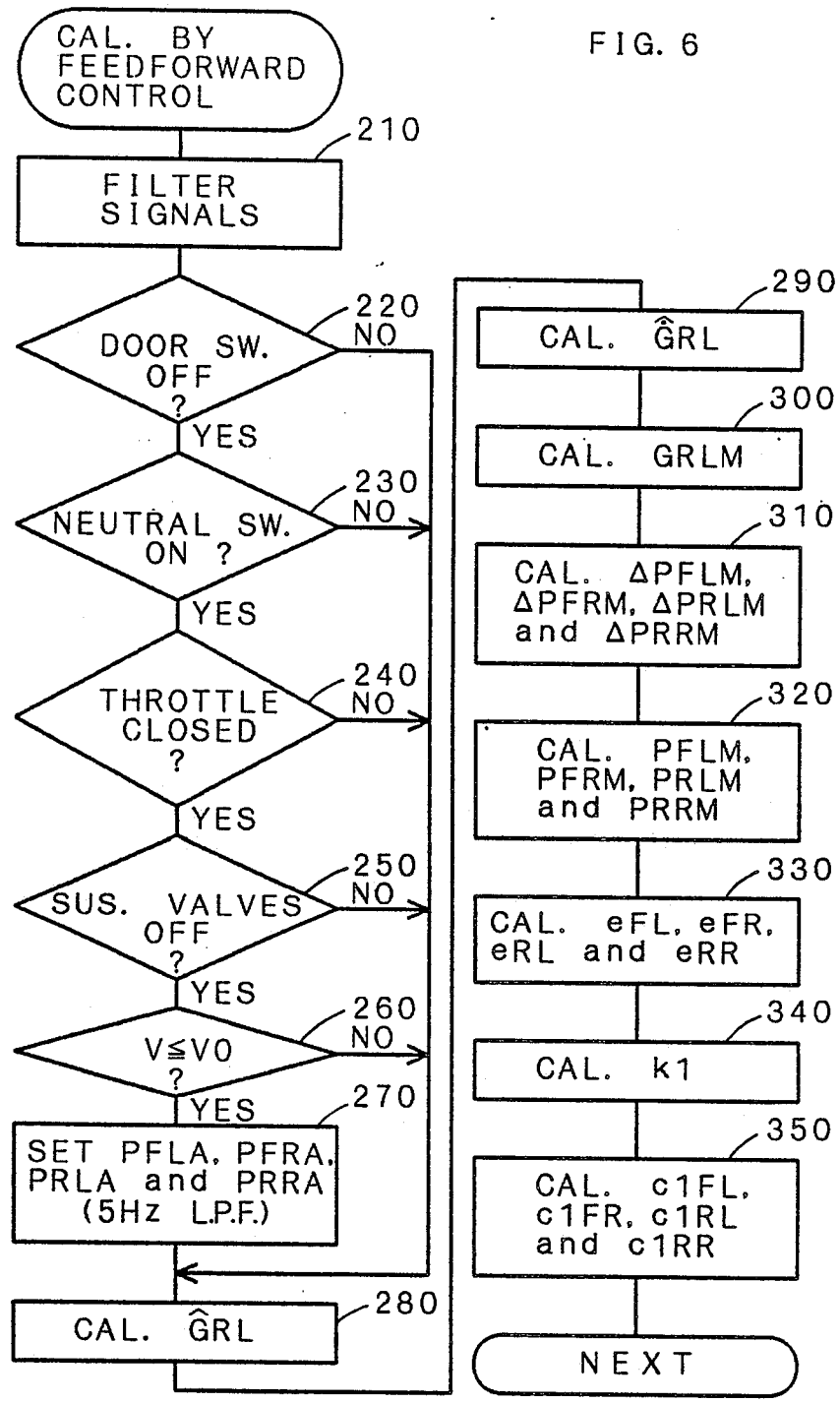
FIG. 6 is a flowchart of a feedforward calculation routine.

Set forth is an explanation of the feedforward control based on the flowchart of FIG. 6. As the first step of this routine, signals input from the sensors are filtered at step 210. A filtered output Y(n) is given by the following formula:

$$Y(n) = \{IF \cdot X(n) + (256 - IF) \cdot Y(n-1)\}/256,$$

in which $X(n)$ is current data input, $Y(n-1)$ is the prior filtered output, and IF is a filtering constant (varying from 1 through 256). By the filtering, noise and data fluctuations of a frequency higher than a preset threshold value can be diminished.

Subsequently, a series of determinations are executed for determining values of factors which will cause a change in the vehicle attitude. At step 220, it is determined by the door switches 94 whether all of the doors are closed. At step 230, it is determined by the neutral switch 95 whether the transmission is in the neutral position. At step 240, the throttle opening sensor 96 determines whether the throttle valve is completely shut. At step 250, it is determined whether the vehicle height control is now in effect. Namely, it is determined whether the suspension control valves such as the high pressure reservoir valves 26 and 30, the leveling valves 42, 44, 46 and 48 and the discharge valves 58, 60, 64 and 66 are in an OFF state. At step 260, it is determined whether the vehicle speed V detected by the speed sensor 93 is lower than a preset value V0. The purpose of the process steps 220, 230, 240 and 260 is to determine the values of factors which will cause a change in the vehicle attitude, e.g., opening/closing of the doors which indicate boarding of passengers, a shift position of the transmission indicating a transmission of power to the wheels, a suction air amount to the internal combustion engine representing the driving force of the vehicle, and the vehicle speed representing the driving state. The purpose of the process step 250 is to determine whether supplying/discharging of the air for controlling the pressures of the air springs 2FL, 2FR, 2RL and 2RR is not executed.

If all of the answers to the determination steps 220 through 260 are YES, it is assumed that the vehicle attitude is stable and that the pressures of the air springs 2FL, 2FR, 2RL and 2RR are not undergoing any remarkable change. In this case, the current values of the pressure sensors 50, 52, 54 and 56 are respectively stored in the RAM 106 as standard pressures PFLA, PFRA, PRLA and PRRA. The value of the filtering constant IF used at step 210 is set so that the standard pressures have values which are obtained from data filtered by a low pass filter with a threshold frequency (e.g., 5 Hz) lower than that used in the filtering executed at step 210.

On the other hand, if any one of the answers to steps 220 through 260 is NO, step 270 is not executed and the standard pressures PFLA, PFRA, PRLA and PRRA are not updated. Namely, under the condition that all of the answers at steps 220 through 260 are YES, the standard pressures PFLA, PFRA, PRLA and PRRA are updated each time.

Figure 10:
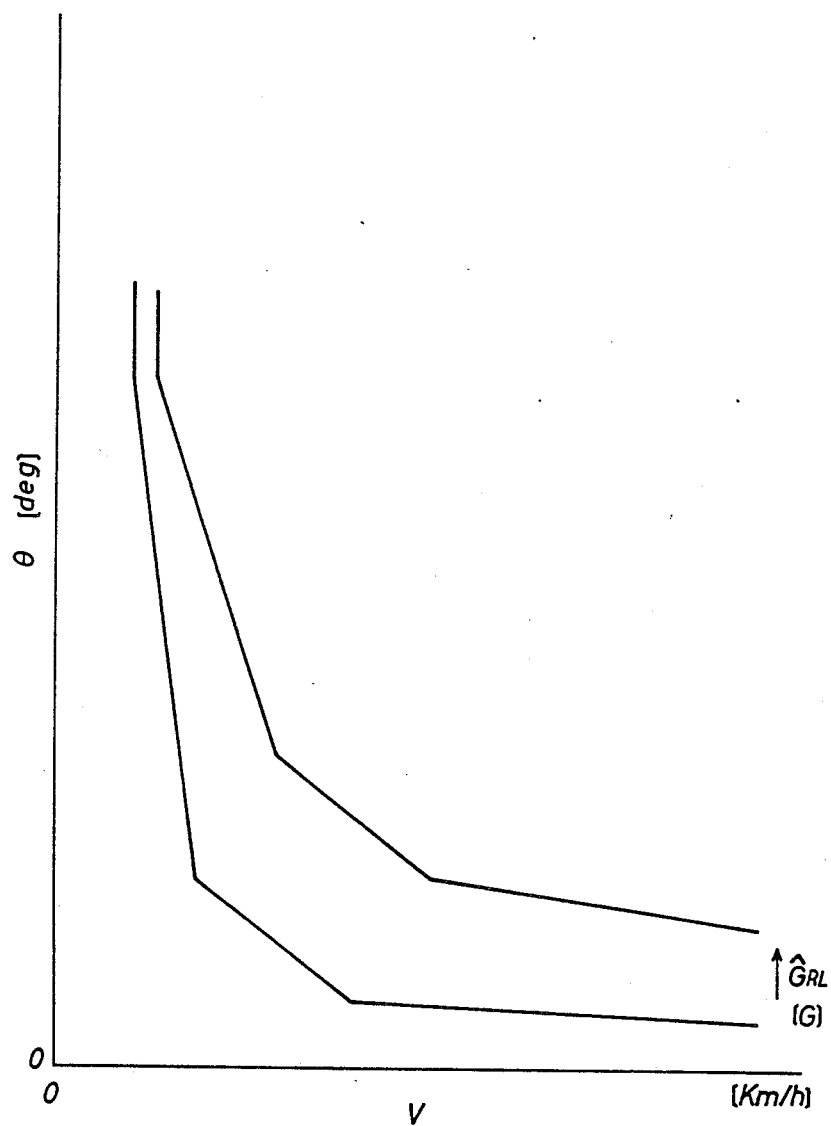
FIG. 10 is a graph showing a map for determining an estimated lateral acceleration GRL based on a steering angle $\theta$ and a vehicle speed V.

After step 270 or if any answer to process steps 220 through 260 is NO, the program proceeds to step 280 at which an estimated lateral acceleration $\hat{GRL}$ is determined based on a vehicle speed V and a steering angle $\theta$ with reference to the map of FIG. 10. Only two examples of different accelerations are shown in the map of FIG. 10, assuming that other cases also bear similar relations. The values of other accelerations can be calculated by an interpolation if necessary.

Figure 11:
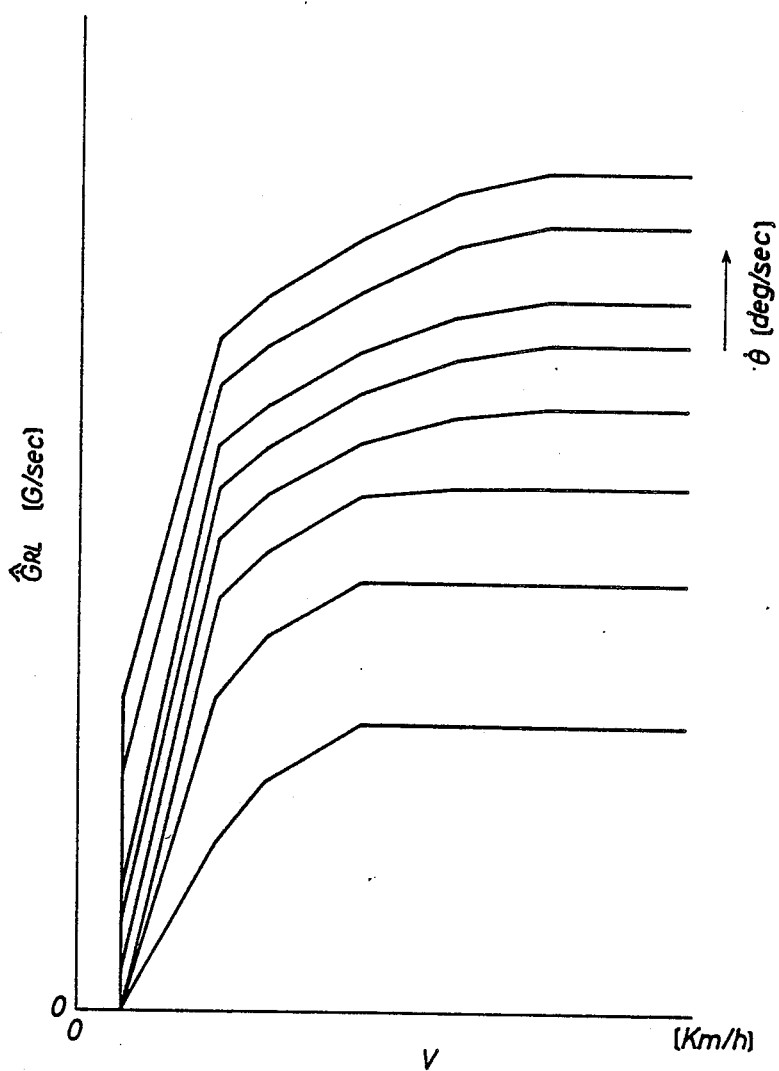
FIG. 11 is a graph showing a map for determining an estimated lateral accelerating rate $\dot{G}RL$ based on a steering angle speed $\dot{\theta}$ and the vehicle speed V.

At step 290, an estimated lateral accelerating rate $\hat{GRL}$ is determined based on a relation between the vehicle speed V and a steering angle speed $\dot{\theta}$ which is a differential of the steering angle $\theta$, with reference to the map of FIG. 11. The steering angle speed $\dot{\theta}$ may be replaced with a change in the steering angle $\theta$ over a predetermined short period. FIG. 11 illustrates examples for eight different steering angle speeds $\dot{\theta}$. Other values can be obtained by interpolation.

At subsequent step 300, an expected acceleration GRLM is calculated according to the following formula:

GRLM=m.$\hat{GRL}$+h.$\hat{GRL}$, wherein m and h are constants having values determined by taking the responsiveness of the system into account. When the responsiveness of the system is low, the value of the constant h is made greater. But, as an excessively large value of h will introduce unstability in the system, the constants m and h are determined through prior experiments (e.g., m=1.0, h=0.1).

Figure 12:
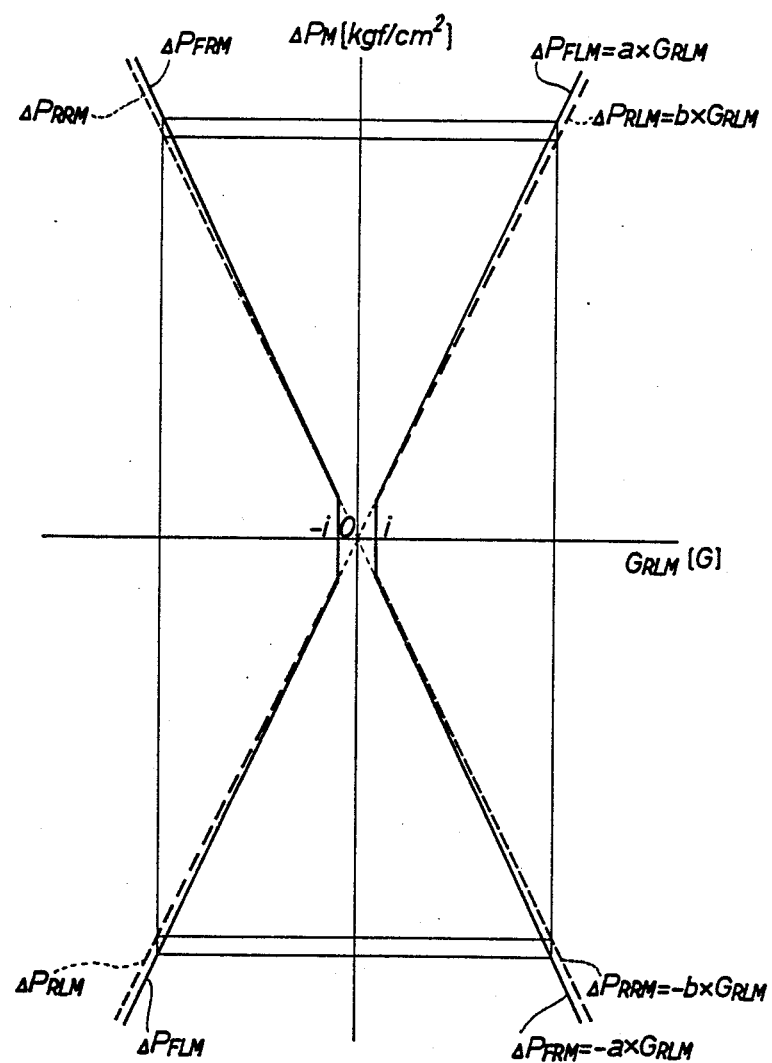
FIG. 12 is a graph showing a map for determining target pressure differences $\Delta PFLM, \Delta PFRM, \Delta PRLM, PRRM$ from an expected lateral acceleration GRLM.

At step 310, target pressure differences $\Delta$PFLM, PFRM PRLM and PRRM of the air springs 2FL, 2FR, 2RL and 2RR of the suspensions 1FL, 1FR, 1RL and 1RR are calculated by utilizing the expected lateral acceleration GRLM with reference to the map of FIG. 12, in which the abscissa represents the expected lateral acceleration GRLM [G, which is the unit equal to the gravitational acceleration] and the ordinate plots the target pressure difference [kgf/cm$^2$]. The target pressure differences PFLM, PFRM, PRLM and PRRM are determined as shown in the map of FIG. 12 and are also represented by formulas as follows:

$\Delta PFLM = a \cdot GRLM,$ $\Delta PFRM = -a \cdot GRLM,$ $\Delta PRLM = b \cdot GRLM$ and $\Delta PRRM = -b \cdot GRLM,$ wherein a and b are coefficients for compensating for the difference in the characteristics of individual suspensions. These coefficients a and b are given by the following formulas:

$a=\{W.h/(tf.rf.Af)\}\cdot\{(Lr/L).Kf\}$ and $b=\{W.h/(tr.rr.Ar)\}\cdot\{1-(Lr/L).Kf\},$ wherein W is the spring mass, h is the height of the center of gravity, tf is the front tread, tr is the rear tread, rf is the front arm ratio, rr is the rear arm ratio, Af is the front sustaining area, Ar is the rear sustaining area, L is the wheelbase and Lr is a distance between the rear axle and the center of gravity. The value of Kf is optionally set within a region of (L/Lr)>Kf$\geq$1.0, and it represents a load allotment ratio of the front wheels. When Kf=1.0, the share of the load at the front is 50%. By optionally setting the value of Kf, the steering characteristic of the vehicle can be optionally set.

In order to avoid the repetition of minor adjustment due to a fluctuation of calculated values, detection errors, noises, and so on, an insensitive region i is set, whereby, when $-i \leq GRLM \leq i$, the target pressure differences PFLM, PFRM, PRLM and PRRM are all set at 0.

Subsequently, target pressures PFLM, PFRM, PRLM and PRRM are calculated at step 320 according to the following formulas:

$PFLM = \Delta PFLM + PFLA,$ $PFRM = \Delta PFRM + PFRA,$ $PRLM = \Delta PRLM + PRLA$ and $PRRM = \Delta PRRM + PRRA.$ Thus, the pressure of individual air springs can be determined at a target value for controlling the vehicle attitude.

At step 330, individual pressure deviations eFL, eFR, eRL and eRR are calculated according to the following formulas:

$eFL = PFLM - PFL,$ $eFR = PFRM - PFR,$

-continued $$eRL = PRLM - PRL \text{ and}$$

$$eRR = PRRM - PRR, \text{ wherein}.$$

PFL, PFR, PRL and PRR are pressure values obtained by filtering the outputs of the pressure sensors 50, 52, 54 and 56 provided for the main air chambers 4FL, 4FR, 4RL and 4RR of the suspensions 1FL, 1FR, 1RL and 1RR.

Figure 13:
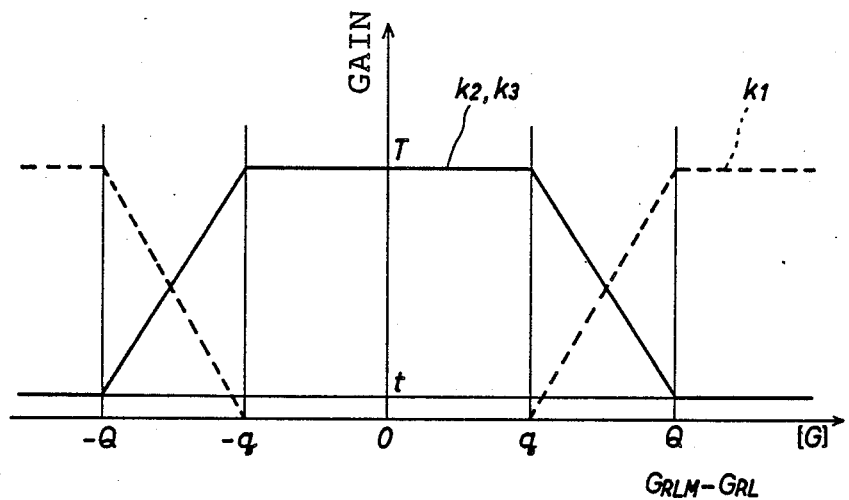
FIG. 13 is a graph showing a map for determining a feedforward gain k1 and feedback gains k2 and k3 based on the difference between the expected lateral acceleration GRLM and an actual lateral acceleration GRL.

In order to convert the pressure deviations into the control amount, a feedforward gain k1 as a share of the feedforward control for the total attitude control is determined at step 340. The feedforward gain k1 is determined based on the difference between the expected lateral acceleration GRLM and the actual lateral acceleration GRL with reference to the dashed line shown in FIG. 13. As shown in FIG. 13, when the difference |GRLM−GRL| is smaller than a preset value q, the value of k1 is set at 0. If |GRLM−GRL| is larger than a preset value Q (larger than q), k1 is set at T. For the region between q and Q, k1 is increased with the increase in |GRLM−GRL|. In the figure, k2 and k3 represent gains as a share of the feedback control which will be described later. If the difference between the expected lateral acceleration GRLM and the current actual lateral acceleration GRL is large, it is expected that roll will occur. Accordingly, the share of the feedforward control in the final control amount increases.

Subsequently, at step 350, feedforward pressure adjustments c1FL, c1FR, c1RL and c1RR to the individual suspensions 1FL, 1FR, 1RL and 1RR are calculated considering the share by utilizing the gain k1 and the pressure differences eFL, eFR, eRL and eRR according to the following formulas:

$$c1FL = k1 \cdot eFL,$$

$$c1FR = k1 \cdot eFR,$$

$$c1RL = k1 \cdot eRL \text{ and}$$

$$c1RR = k1 \cdot eRR.$$

Thus, the feedforward control is executed and the feedforward pressure adjustments c1FL, c1FR, c1RL and c1RR are calculated.

In the above explanation, the estimated lateral acceleration $\hat{G}RL$ is calculated based on the vehicle speed V and the steering angle θ at step 280 with reference to the map of FIG. 10, and the estimated lateral accelerating rate $\hat{G}RL$ is calculated from the vehicle speed V and the steering angle speed θ̇ at step 290 with reference to the map of FIG. 11. If a longitudinal acceleration and longitudinal accelerating rate are estimated instead of the lateral counterparts $\hat{G}RL$ and $\hat{G}RL$, pitch of the body can be controlled. An estimated longitudinal acceleration $\hat{G}FR$ can be determined based on the vehicle speed V and a throttle opening θTH with reference to the map of FIG. 23, and an estimated longitudinal accelerating rate $\hat{G}FR$ can be obtained based on the vehicle speed V and a throttle opening speed θ̇TH with reference to the map of FIG. 24. Then a longitudinal acceleration GFRM is expected from the estimated longitudinal acceleration $\hat{G}FR$ and the longitudinal accelerating rate $\hat{G}FR$ and the squat of the body can be controlled. The throttle opening θTH and the throttle opening speed θ̇TH are detected by the throttle opening sensor 88.

Moreover, a rotational speed N of the engine can be used instead of the vehicle speed V. Namely, the estimated longitudinal acceleration $\hat{G}FR$ is determined based on the engine speed N and the throttle opening θTH with reference to FIG. 25, and the estimated longitudinal accelerating rate $\hat{G}FR$ is obtained from the engine speed N and the throttle opening speed θ̇TH with reference to FIG. 26. By utilizing the estimated longitudinal acceleration $\hat{G}FR$ and the estimated longitudinal accelerating rate $\hat{G}FR$, the expected acceleration GFRM is calculated. The engine speed N is detected by the speed sensor 93.

An anti-dive control can be similarly performed. A brake pedal displacement θBR and its differential, a braking speed, θ̇BR may be used in place of the throttle valve opening θTH and the throttle opening speed θ̇TH. Namely, the estimated longitudinal acceleration $\hat{G}FR$ is obtained from the vehicle speed V and the brake pedal displacement θBR based on FIG. 27, and the estimated longitudinal accelerating rate $\hat{G}FR$ is determined from the vehicle speed V and the braking speed θ̇BR based on FIG. 28. By utilizing the estimated longitudinal acceleration $\hat{G}FR$ and the estimated longitudinal accelerating rate $\hat{G}FR$, the expected longitudinal acceleration GFRM can be calculated. The brake pedal displacement θBR and the braking speed θ̇BR can be detected by a brake sensor (not shown) for outputting signals corresponding to the brake pedal displacement to the ECU 100.

Figure 7A:
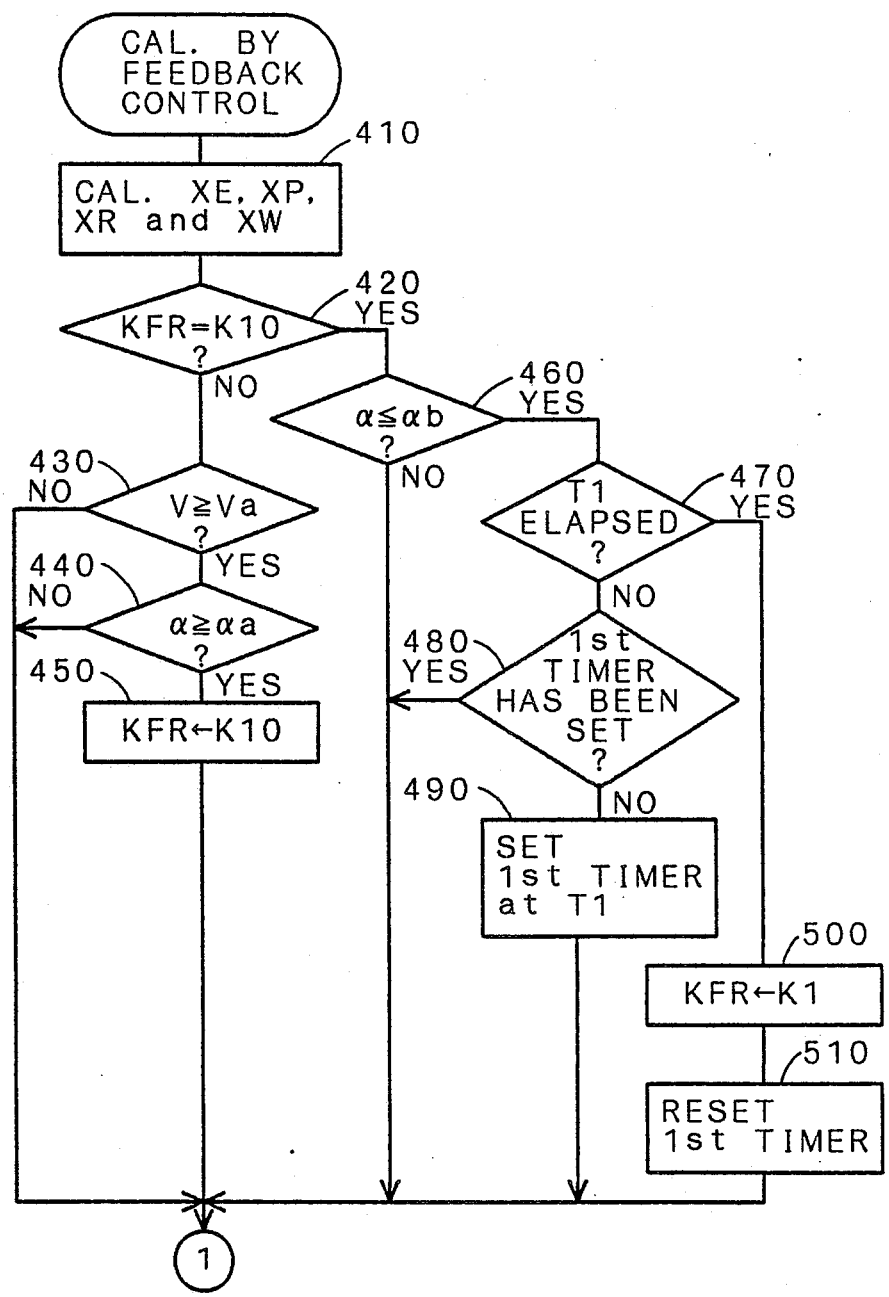
FIGS. 7A and 7B are flowcharts of a feedback calculation routine.
Figure 7B:
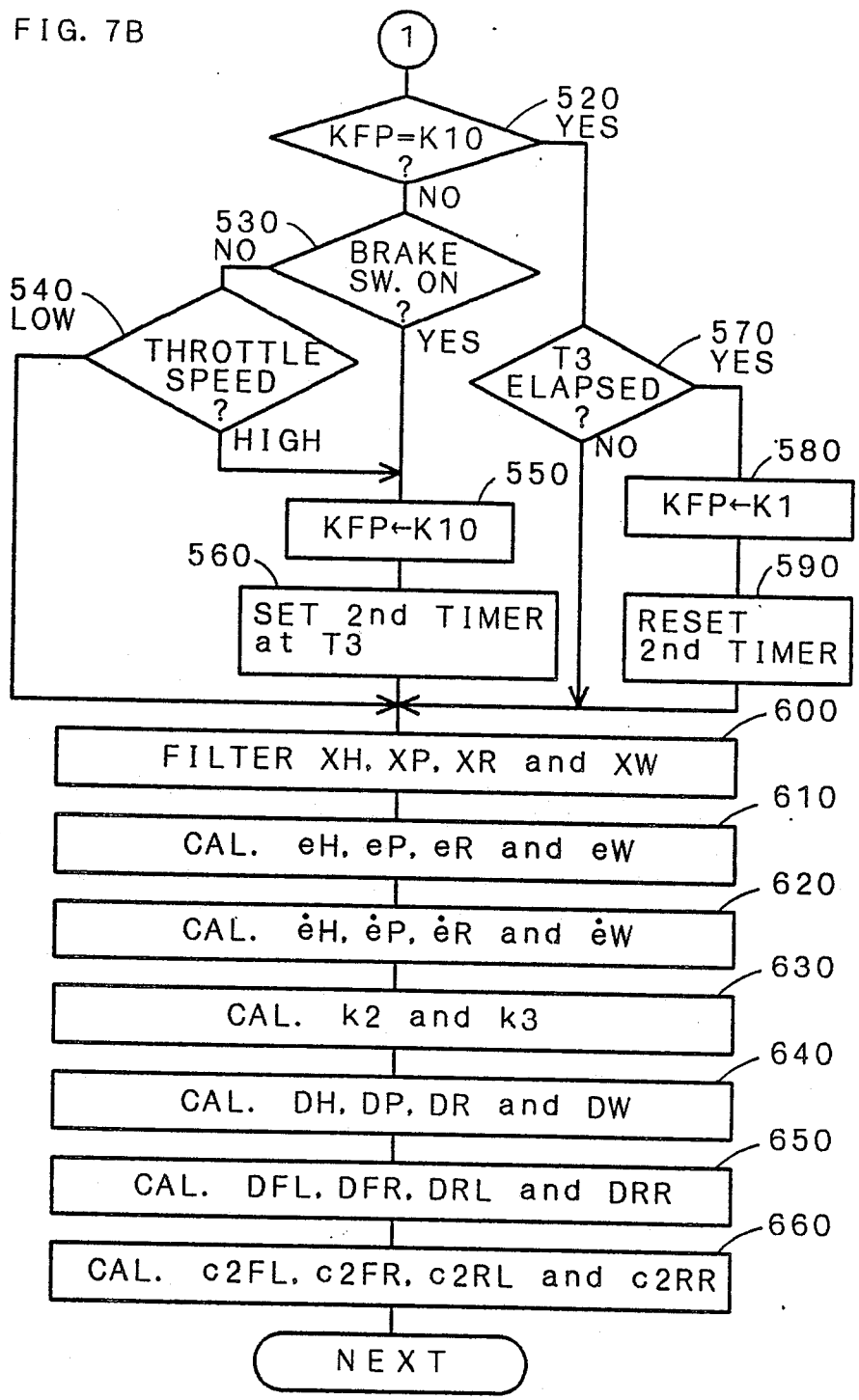

Then the feedback control calculations are executed according to the flowcharts of FIGS. 7A and 7B, where the present invention is featured. Outputs XFL, XFR, XRL and XRR from the height sensors 80, 82, 84 and 86 at respective suspensions 1FL, 1FR, 1RL and 1RR are, at step 410, converted into displacements of four modes of attitude changes: a vertical translational displacement XH, a pitch displacement XP, a roll displacement XR and a warp displacement XW. The conversion is executed according to the following equations:

$$XH = (XFR + XFL) + (XRR + XRL),$$

$$XP = (XFR + XFL) - (XRR + XRL),$$

$$XR = (XFR - XFL) + (XRR - XRL), \text{ and}$$

$$XW = (XFR - XFL) - (XRR - XRL),$$

where XFR is a body height at the front right, XFL is that at the front left, XRL is that at the rear right and XRR is that at the front right.

At next step 420, it is determined whether a filtering constant KFR is equal to a value K10. The filtering constant KFR is utilized at a later step (600) for low-pass-filtering the roll displacement signal XR. If the decision is NO, steps 430 and 440 are executed to determine whether a lateral acceleration of the body is expected to develop. Namely, when the vehicle speed V detected by the speed sensor 93 is greater than a predetermined speed Va (e.g., 20 km/h) and the steering angle α detected by the steering angle sensor 90 is greater than a predetermined angle αa (e.g., 30°), the body is expected to develop a lateral acceleration and therefore the filtering constant KFR is changed to the value K10 (e.g., a value corresponding to a threshold frequency of 10 Hz) at step 450. When those conditions are not satisfied at steps 430 and 440, the filtering constant KFR is not changed (i.e., the filtering constant remains at K1 as explained later).

When the current filtering constant KFR is determined to be at K10 at step 420, it is determined at step 460 whether the steering angle α is less than another predetermined smaller angle αb (e.g., 10°). If the decision here is NO, i.e., the steering wheel 89 is not returned nearer to the straightforward position, the processing goes directly to step 520. When the steering angle α is less than αb, the roll of the body is not expected and it is determined at step 470 whether a time interval T1 has elapsed by referring to a first timer set at step 490. If T1 has not elapsed at step 470, it is determined at step 480 whether the first timer has been set. If the first timer has not been set, the timer is set at T1 (e.g., 0.5 sec) at step 490.

When it is determined at step 480 that T1 has elapsed since the first timer is set, the filtering constant KFR is changed to the other value K1 (e.g., a value corresponding to a threshold frequency of 1 Hz) at step 500. Then the first timer is reset at 0 at step 510.

Namely, when the vehicle speed V is higher than Va and the steering angle α is greater than αa, the filtering constant KFR (a parameter utilized for low-pass-filtering the roll displacement signal XR at step 600 and corresponding to a threshold frequency of the low-pass filter) is changed to K10 (a value corresponding to a higher threshold frequency) because a roll of the body is expected to occur. After the time interval T1 during which the steering angle α is returned to less than αb, the constant KFR is changed to K1 (a value corresponding to a lower threshold frequency) because a roll is not expected.

When the decision is NO at step 430, 440 or 460, or after executing step 450, 490 or 510, it is then determined at step 520 whether another filtering constant KFP is equal to the value K10. This filtering constant KFP is also utilized at a later step (600) for low-pass-filtering the pitch displacement signal XP. If the decision is NO, steps 530 and 540 are executed to determine whether a longitudinal acceleration of the body is expected to develop. Namely, when the brake pedal is detected to be operated by the brake switch 87, the body is expected to develop a longitudinal acceleration and the processing goes to step 550. Further, when an opening speed of the throttle valve is greater than a preset value, the body is also expected to develop a longitudinal acceleration. The opening speed is determined by measuring the time interval for which the throttle valve passes three divisions among six divisions of the entire throttle opening. When the time interval is less than a preset value T2 (e.g., 0.15 sec), the throttle opening speed is determined to be high and the processing proceeds to step 550. At step 550, the filtering constant KFP is changed to K10 and, at next step 560, a second timer is set at a value T3 and is started down counting.

When decision at step 520 is YES, it is determined at step 570 whether the time interval T3 has elapsed by referring to the second timer set at step 560. After T3 has elapsed since the second timer is started at step 560, the filtering constant KFP is changed to K1 at step 580 and the second timer is reset at 590.

Namely, when the brake pedal is operated (decelerating) or when the throttle valve is rapidly opening (accelerating), the filtering constant KFP is changed to K10 which corresponds to a higher threshold frequency (e.g., 10 Hz) for the low-pass filtering at subsequent step 600. After the time interval T3, the filtering constant KFP is restored to K1 which corresponds to a lower threshold frequency (e.g., 1 Hz).

Step 600 is for executing the low-pass filtering. Signals representing the vertical translational displacement XH, pitch displacement XP, roll displacement XR and warp displacement XW are filtered to pass only their low frequency components. Specifically, for example, the roll displacement XR is filtered by utilizing the filtering constant KFR as follows:

$$\overline{XR}(n) = KFR \cdot XR(n) + (1 - KFR) \cdot \overline{XR}(n-1),$$

where $XR(n)$ is the displacement data input this time, $\overline{XR}(n-1)$ is the displacement data filtered at the previous execution of this routine and $\overline{XR}(n)$ is the filtered displacement data. The pitch displacement XP is similarly filtered by utilizing the filtering constant KFP. When lateral or longitudinal acceleration of the body is expected, the roll displacement XR or the pitch displacement XP is filtered with a higher threshold frequency, as the filtering constant KFR or KFP is changed to K10. When no such body acceleration is expected, the displacement data XR or XP is filtered with a lower threshold frequency, as the filtering constant KFR or KFP is set at K1. In this embodiment, the other two displacement data XH and XW are filtered by a fixed filtering constant (e.g., corresponding to a lower frequency than that for K1).

Based on the above calculated displacements XH, XP, XR and XW, displacement deviations eH, eP, eR and eW for each displacement mode are calculated at step 610 in accordance with the following formulas:

$$eH = XHM - XH,$$
$$eP = XPM - XP,$$
$$eR = XRM - XR \text{ and}$$
$$eW = XWM - XW, \text{ wherein}$$

Figure 14:
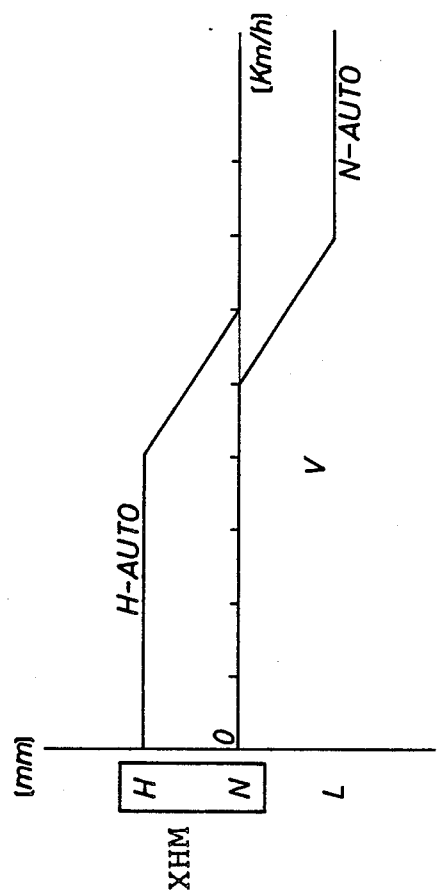
FIG. 14 is a graph showing a map for determining a target vertical translational displacement XHM based on the vehicle speed V and a vehicle height mode.

XHM represents a target vertical translational displacement which is determined from the vehicle speed V and a mode (H-AUTO or N-AUTO) selected by the high switch 97 or the low switch 98 as shown in the map of FIG. 14. XPM is a target pitch displacement which is determined from the actual longitudinal acceleration GFR detected by the acceleration sensor 92 based on the map of FIG. 15. XRM is a target roll displacement which is determined from the actual lateral acceleration GRL based on the map of FIG. 16. XWM is a target warp displacement which is normally set at 0.

By utilizing differentials $\dot{X}H$, $\dot{X}P$, $\dot{X}R$ and $\dot{X}W$ of the displacements XH, XP, XR and XW, speed deviations $\dot{e}H$, $\dot{e}P$, $\dot{e}R$ and $\dot{e}W$ for each mode are calculated at step 620 in accordance with the following formulas. The variables $\dot{X}H$, $\dot{X}P$, $\dot{X}R$ and $\dot{X}W$ may be replaced with differences of XH, XP, XR and XW during a predetermined short period.

$$\dot{e}H = \dot{X}HM - \dot{X}H,$$
$$\dot{e}P = \dot{X}PM - \dot{X}P,$$
$$\dot{e}R = \dot{X}RM - \dot{X}R \text{ and}$$
$$\dot{e}W = \dot{X}WM - \dot{X}W.$$

In the above formulas, $\dot{X}HM$ represents a target longitudinal translational displacement speed which is normally set at 0. $\dot{X}PM$ is a target pitch displacement speed which is determined from the longitudinal accelerating rate $\dot{G}FR$ based on the map of FIG. 17. $\dot{X}RM$ is a target roll displacement speed which is determined from the lateral accelerating rate $\dot{G}RL$ based on the map of FIG. 18. $\dot{X}WM$ is a target warp displacement speed which is normally set at 0.

Figure 15:
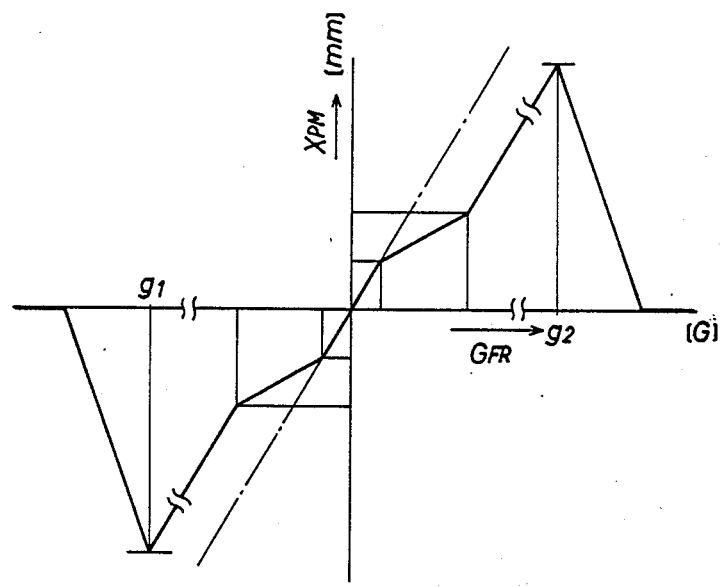
FIG. 15 is a graph showing a map for determining a target pitch displacement XPM from an actual longitudinal acceleration GFR.
Figure 16:
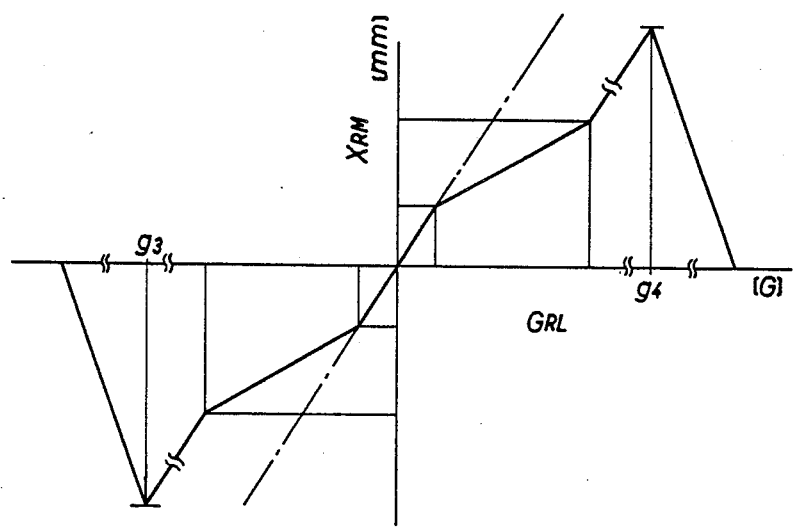
FIG. 16 is a graph showing a map for determining a target roll displacement XRM based on the actual lateral acceleration GRL.
Figure 17:
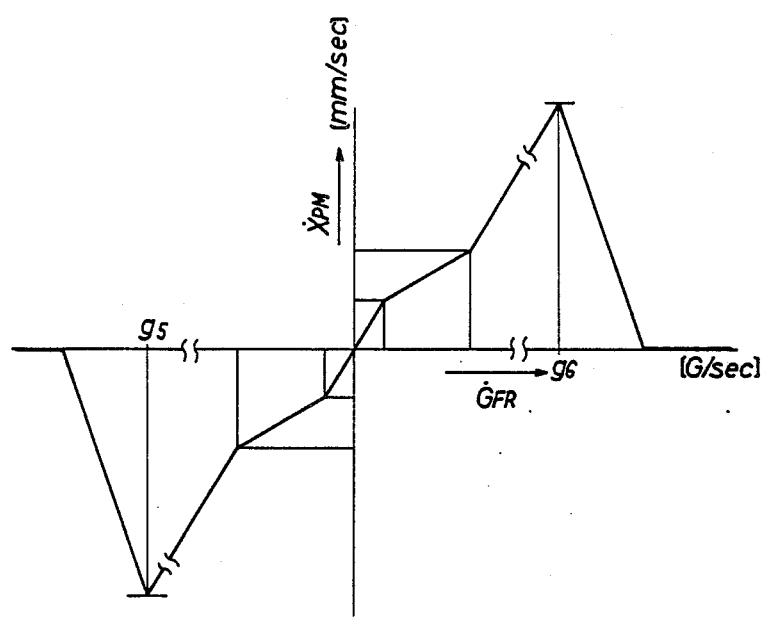
FIG. 17 is a graph showing a map for determining a target pitch displacement speed $\dot{X}PM$ based on an actual longitudinal accelerating rate $\dot{G}RL$.
Figure 18:
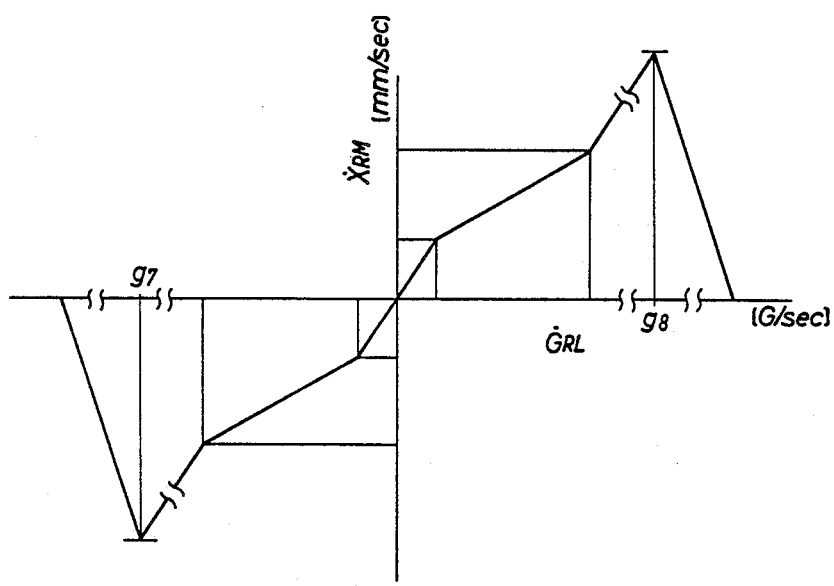
FIG. 18 is a graph showing a map for determining a target roll displacement speed $\dot{X}RM$ based on an actual accelerating rate $\dot{G}RL$.

The map shown by FIG. 15 is so predetermined in this embodiment that the target pitch displacement XPM linearly decreases toward zero as the actual longitudinal acceleration GFR decreases below a predetermined value g1 or as GFR increases beyond another predetermined value g2, while XPM normally increases as GFR increases. Similarly, as shown in FIG. 16, the target roll displacement XRM linearly decreases toward zero as the actual lateral acceleration GRL decreases below g3 or increases beyond g4. FIGS. 17 and 18 show that the target pitch displacement speed $\dot{X}PM$ and the target roll displacement speed $\dot{X}RM$ are also determined to linearly decrease toward zero for respective accelerating rates $\dot{G}FR$ and $\dot{G}RL$ decreasing or increasing beyond ranges g5-g6 and g7-g8. The lower boundary values g1 and g3 are determined at values close to abnormal acceleration values corresponding to the signal input from the acceleration sensor 92 when the wire between the sensor 92 and the ECU 100 breaks. The higher boundary values g2 and g4 are determined at values close to abnormal acceleration values corresponding to the signal input from the acceleration sensor 92 when the wire between the sensor 92 and the ECU 100 makes a short circuit. The boundary values g5-g9 are similarly determined.

These settings of the maps for determining the target values XPM, XRM, $\dot{X}PM$ and $\dot{X}RM$ prevent any abnormality in the acceleration sensor 92 from erroneously affecting the attitude control and maintain stable attitude control as the target values XPM, XRM, $\dot{X}PM$ and $\dot{X}RM$ are set nearer to zero (which represents the uninclined body attitude). Since the attitude control is not totally stopped when a temporary abnormal signal is input, normal control is continued after the acceleration signal is restored to normal. This is especially effective when the difference between the expected acceleration GRLM and the actual acceleration GRL is small, i.e., the body attitude is in stable condition, because the feedback gains k2 and k3 are set at larger values (FIG. 13).

In order to convert the individual displacements into the control amount, feedback gains k2H, k2P, k2R and k2W (which are represented by k2) and k3H, k3P, k3R, and k3W (represented by k3) are determined as the share of feedback control at step 630. Namely, the gains k2 and k3 are determined in response to the difference between the expected lateral acceleration GRLM and the actual lateral acceleration GRL with reference to the map shown by a solid line in FIG. 13. As shown in FIG. 13, when the difference |GRLM−GRL| is smaller than the preset value q, k2 and k3 are set at T. If larger than the preset value Q, k2 and k3 are set at a small value t. For the region between q and Q, k2 and k3 decreases with the increase in |GRLM−GRL|. Accordingly, if the difference between the expected lateral acceleration GRLM and the actual lateral acceleration GRL is small, the share of the feedback control to the final control amount is increased because the attitude of the vehicle body is assumed in a stable condition.

Based on the deviations èH, èP, èR and èW and the deviation speeds eH, eP, eR, and eW, feedback amounts DH, DP, DR and DW for the corresponding modes are calculated at step 640 considering the share of the control in accordance with the following formulas:

$$DH = k2H \cdot eH + k3H \cdot \dot{e}H + k4H,$$

$$DP = k2P \cdot eP + k3P \cdot \dot{e}P + k4P,$$

$$DR = k2R \cdot eR + k3R \cdot \dot{e}R + k4R \text{ and}$$

$$DW = k2W \cdot eW + k3W \cdot \dot{e}W + k4W, \text{ wherein}$$

k2H, k2P, k2R, k2W, k3H, k3P, k3R and k3W are constants determined by taking account of the responsiveness of the system (e.g., k2H, k2P, k2R, k2W =0.5; k3H, k3P, k3R, k3W =0.3) k4H, k4P, k4R and k4W are also preset constants for compensating hardware configuration of the system (e.g., the difference in the length of the air pipes between left and right or between front and rear), and may be all set at 0.

By utilizing the feedback amounts DH, DP, DR and DW for the individual modes, feedback control amounts DFL, DFR, DRL and DRR for the suspensions 1FL, 1FR, 1RL and 1RR are calculated in accordance with the following formulas:

DFL=(¼)(kOH.DH+2kOP.Lf.DP−kOR.DR−kOW.DW),

DFR=(¼)(kOH.DH+2kOP.Lf.DP+kOR.DR+kOW.DW),

DRL=(¼)(kOH.DH−2kOP.(1−Lf).DP−kOR.DR+kOW.DW) and

DRR=(¼)(kOH.DH−2kOP.(1−Lf).DP+kOR.DR−kOW.DW)

In the above formulas, kOH, kOP, kOR and KOW are control gains for heave (translational movement), pitch, roll and warp, respectively, and are determined from design policy. When kOP and kOR are set at larger values, pitch and roll can be suppressed but in usual cases they may be all set at 1. Lf represents a load allotment ratio between the front and rear axles determined by considering the position of the center of gravity within the wheelbase.

At step 660, feedback pressure adjustments c2FL, c2FR, c2RL and c2RR are calculated by utilizing the feedback amounts DFL, DFR, DRL and DRR in accordance with the following formulas:

$$c2FL = PFL \cdot a2FL \cdot DFL,$$

$$c2FR = PFR \cdot a2FR \cdot DFR,$$

$$c2RL = PRL \cdot a2RL \cdot DRL \text{ and}$$

$$c2RR = PRR \cdot a2RR \cdot DRR, \text{ wherein}$$

PFL, PFR, PRL and PRR are obtained by filtering the outputs of the pressure sensors 50, 52, 54 and 56 of the main air chambers 4FL, 4FR, 4RL and 4RR, and a2FL, a2FR, a2RL and a2RR are predetermined coefficients.

Thus, the feedback control process is executed and the feedback pressure adjustments c2FL, c2FR, c2RL and c2RR are calculated considering the share of the control.

Figure 8:
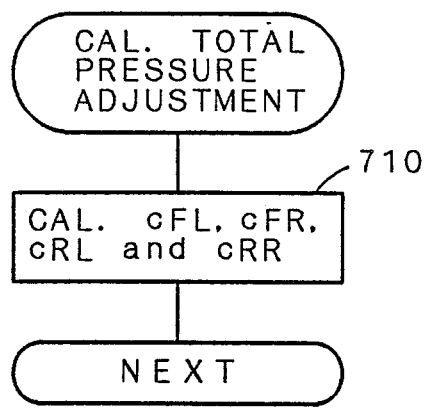
FIG. 8 is a flowchart of a total pressure adjustment calculation routine.

Subsequently, the calculation of the total pressure adjustment is executed at step 710 in the flowchart of FIG. 8. Total pressure adjustments cFL, cFR, cRL and cRR for controlling the vehicle attitude are calculated by adding the feedforward pressure adjustments c1FL, c1FR, c1RL and c1RR and the feedback pressure adjustments c2FL, c2FR, c2RL and c2RR, as follows:

$$cFL = c1FL + c2FL,$$
$$cFR = c1FR + c2FR,$$
$$cRL = c1RL + c2RL \text{ and}$$
$$cRR = c1RR + c2RR.$$

Set forth is the explanation of the valve controls for controlling air flow to/from the main air chambers 4FL, 4FR, 4RL and 4RR of the suspensions 1FL, 1FR, 1RL and 1RR. Reference is now made to the flowchart of FIG. 9A.

In order to adjust the pressures of the main air chambers 4FL, 4FR, 4RL and 4RR based on the total pressure adjustments cFL, cFR, cRL and cRR, VALVE-ON intervals tFL, tFR, tRL and tRR for the high pressure reservoir valves 26 and 30, the leveling valves 42, 44, 46 and 48 or the discharge valves 58, 60, 64 and 66 are calculated at step 810 in accordance with the following formulas.

When the high pressure reservoir valves 26 and 30 and the leveling valves 42, 44, 46 and 48 are in the ON state, namely, when the pressures are increasing, $$tFL = (aF/\phi) \cdot (cFL/PFH),$$
$$tFR = (aF/\phi) \cdot (cFR/PFH),$$
$$tRL = (aR/\phi) \cdot (cRL/PRH) \text{ and}$$
$$tRR = (aR/\phi) \cdot (cRR/PRH);$$

when the discharge valves 58, 60, 64 and 66 are in the ON state, namely, when the pressures are decreasing, $$tFL = (bF/\phi) \cdot (cFL/PFL),$$
$$tFR = (bF/\phi) \cdot (cFR/PFR),$$
$$tRL = (bR/\phi) \cdot (cRL/PRL) \text{ and}$$
$$tRR = (bR/\phi) \cdot (cRR/PRR).$$

Figure 19:
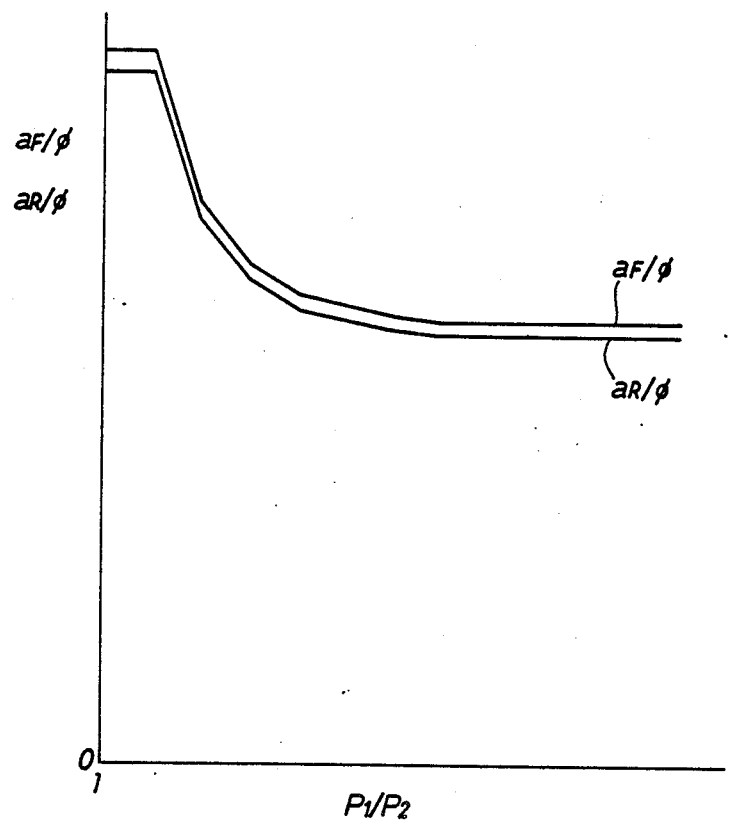
FIG. 19 is a graph showing a map for determining coefficients $aF/\phi$ and $aR/\phi$ based on a ratio P1/P2, i.e., the ratio of a high pressure tank pressure P1 to a pressure P2 of a main air chamber receiving air from the high pressure tank.

In the above formulas, $aF/\phi$ and $aR/\phi$ are determined from a ratio P1/P2, i.e., the ratio of the high-pressure tank pressure P1 (=PFH or PRH) to the pressure P2 of the main air chamber receiving the air from the high pressure tank, with reference to the map of FIG. 19. The high pressure tank is the front high pressure reserve tank 28 or the rear high pressure reserve tank 30. The pressures PFH and PRH respectively indicate the pressures of the tanks 28 and 31.

Figure 20:
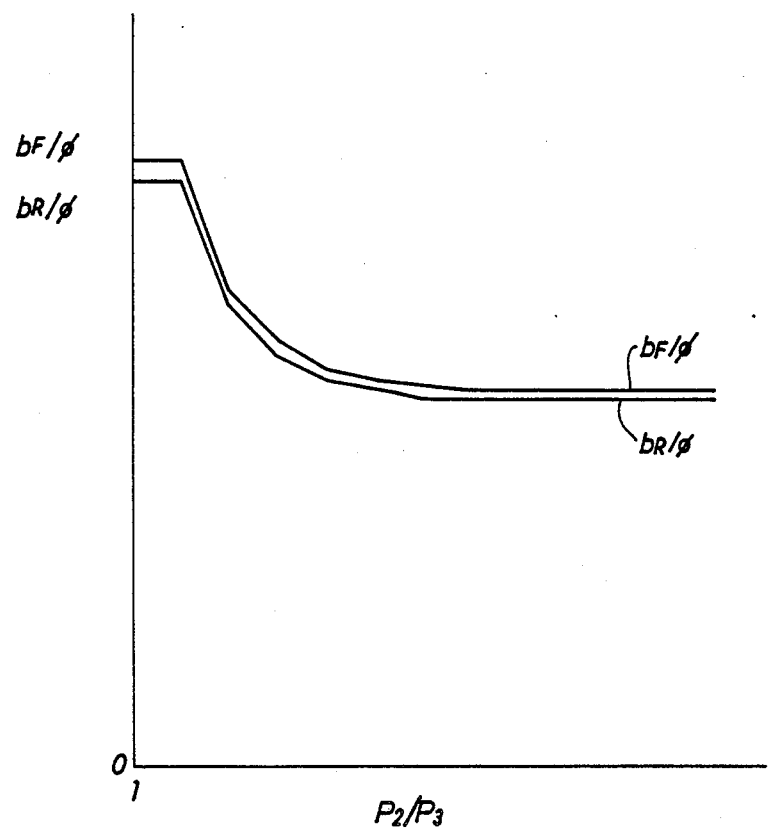
FIG. 20 is a graph showing a map for determining coefficients $bF/\phi$ and $bR/\phi$ based on a ratio P2/P3, i.e., a ratio of the main air chamber pressure P2 to a pressure P3 of a low pressure tank receiving air discharged from the main air chamber.
Figure 21:
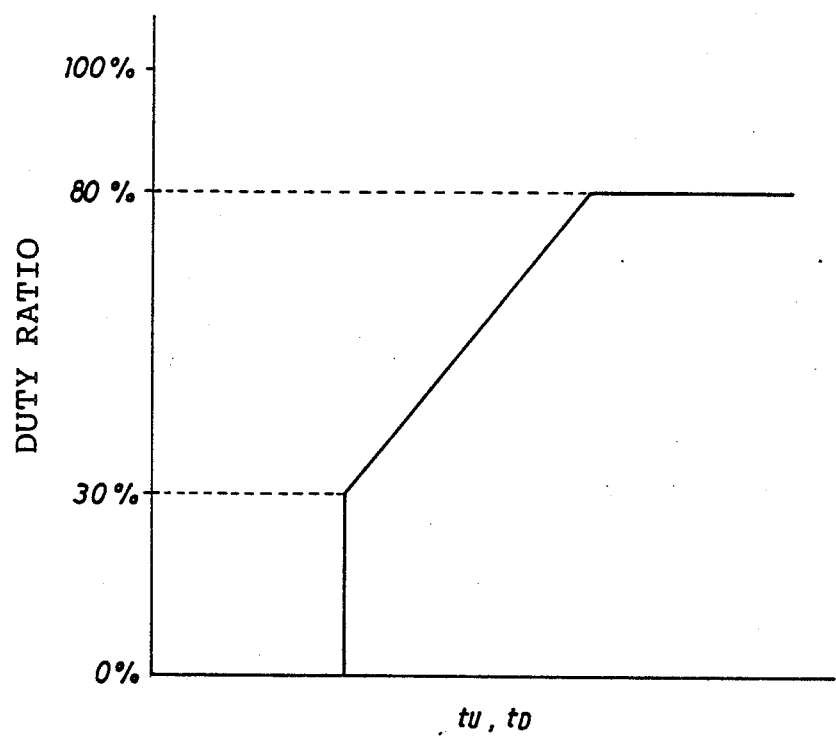
FIG. 21 is a graph showing a map for determining a duty ratio based on a calculated valve energizing time interval tU or tD.

In a similar manner, $bF/\phi$ and $bR/\phi$ are determined from a ratio P2/P3, i.e., the ratio of the main air chamber pressure P2 to the pressure P3 of the low pressure tank receiving the air discharged from the main air chambers, with reference to the map of FIG. 20. The low pressure tank is the front low pressure reserve tank 62 or the rear low pressure reserve tank 68.

At subsequent step 820, correction of the VALVE-ON interval is executed. Namely, valve energizing time intervals tFLU, tFRU, tRLU and tRRU (tFLD, tFRD, tRLD and tRRD) are calculated based on the VALVE-ON intervals tFL, tFR, tRL and tRR according to the following formulas.

When the high pressure reservoir valves 26 and 30 and the leveling valves 42, 44, 46 and 48 are ON, i.e., when the pressures are increasing, $$tFLU = \alpha F \cdot tFL + \beta FL,$$
$$tFRU = \alpha F \cdot tFR + \beta FR,$$
$$tRLU = \alpha R \cdot tRL + \beta RL \text{ and}$$
$$tRRU = \alpha R \cdot tRR + \beta RR.$$

When the discharge valves 58, 60, 64 and 66 are ON, i.e., when the pressures are decreasing, $$tFLD = \gamma F \cdot tFL + \delta FL,$$
$$tFRD = \gamma F \cdot tFR + \delta FR,$$
$$tRLD = \gamma R \cdot tRL + \delta RL \text{ and}$$
$$tRRD = \gamma R \cdot tRR + \delta RR.$$

In the above formulas, $\alpha F$, $\gamma F$, $\alpha R$ $\gamma R$ are coefficients determined by taking following factors into account: valve characteristics, length of pipes, environmental temperature of the valves (e.g., engine room temperature), etc. They may be all set at 1. $\beta FL$, $\beta FR$, $\beta RL$ $\beta RR$, $\delta FL$, $\delta FR$, $\delta RL$ and $\delta RR$ are difference of the time intervals needed to open and close the valves. For example, when a valve needs 30 msec to open and 10 msec to close, those values are set at 20 [msec].

At step 830, guarding of the valve energizing times tFLU, tFRU, tRLU and tRRU (represented by tU) and tFLD, tFRD, tRLD and tRRD (represented by tD) is executed. Namely, though the duty ratio of the valve energization signal is basically proportional to the calculated time interval tU or tD, 0% duty ratio for the valve energization signal is determined for the valve energizing time interval tU or tD shorter than a predetermined small interval. For tU or tD longer than a predetermined large interval, the duty ratio is fixed at 80%. This guarding of the valve energizing time interval prevents the electro-magnetic air valves from working excessively frequently with a very short time interval, whereby the valves are protected from failures.

At step 840, valve energizing signals for pertinent valves among the valves 26, 30, 42, 44, 46, 48, 58, 60, 64 and 66 of the air circuit AC are prepared in response to the duty ratio.

Figure 9A:
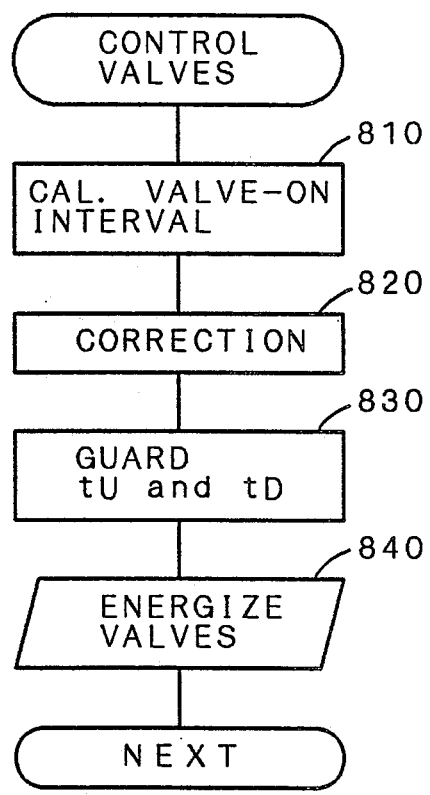
FIG. 9A is a flowchart of a valve control routine.
Figure 9B:
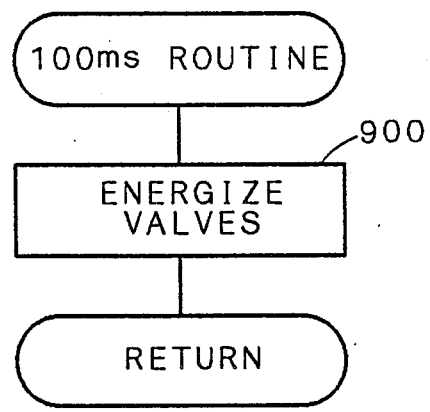
FIG. 9B is a flowchart of a valve energization routine.

After step 840, the present routine for calculating the air suspension control amount is once concluded. Upon restarting the routine of FIG. 5 after the preset time interval, the determination of step 103 is made negative and the program proceeds to step 110. Thereafter, the same processes as the preceding ones resume. In the present embodiment, the valve controlling cycle time interval based on the above-mentioned duty ratio is 100 msec. Namely, the valves 26, 30, 42, 44, 46, 58, 60, 64 and 66 are duty controlled within this 100 msec interval. As shown by the flowchart of FIG. 9B, the valves 26, 30, 42, 44, 46, 48, 58, 60, 64 and 66 are duty controlled every 100 msec at step 900.

Figure 22A:
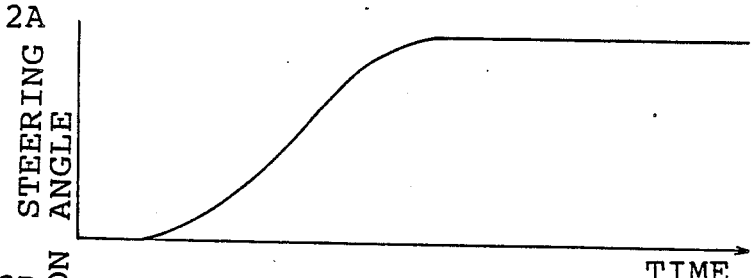
FIGS. 22A, 22B, 22C, 22D and 22E are timing charts indicating effects of the embodiment.
Figure 22B:
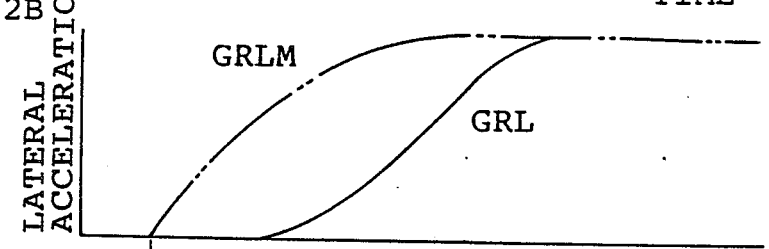
Figure 22C:
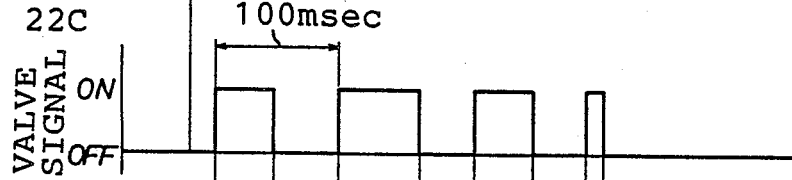
Figure 22D:
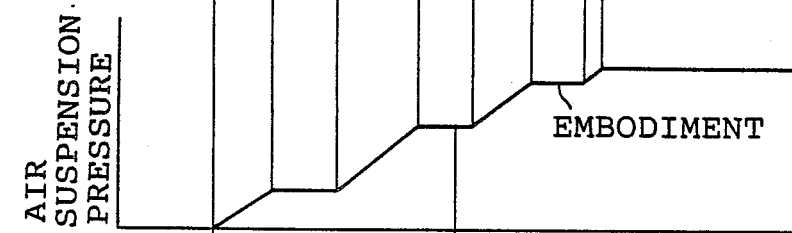
Figure 22E:
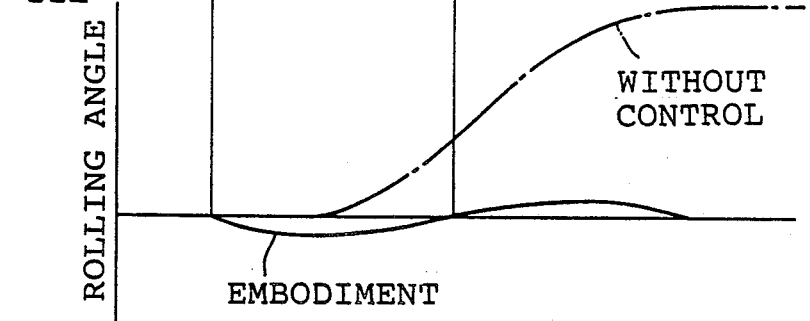
Figure 23:
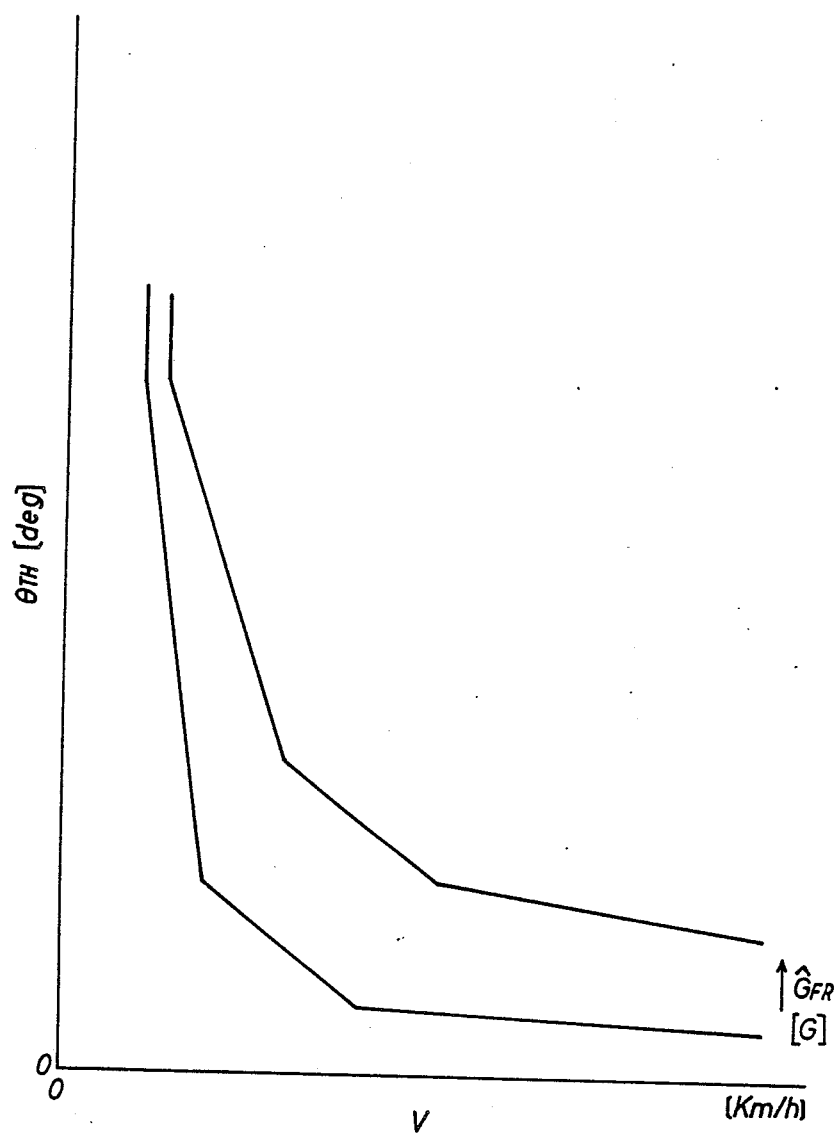
FIG. 23 is a graph showing a map for determining the estimated longitudinal acceleration $\hat{G}FR$ based on a throttle opening $\phi TH$ and the vehicle speed V.
Figure 24:
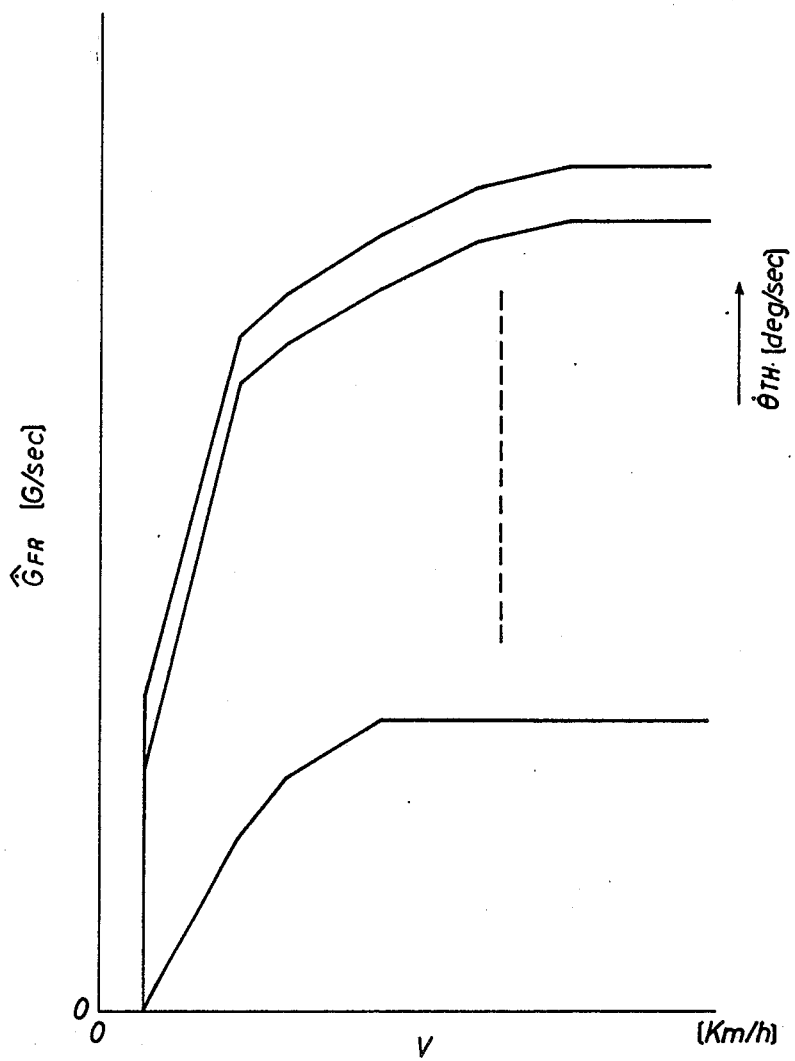
FIG. 24 is a graph showing a map for determining the estimated longitudinal accelerating rate $\hat{G}FR$ based on a throttle opening speed $\dot{\theta}TH$ and the vehicle speed V.
Figure 25:
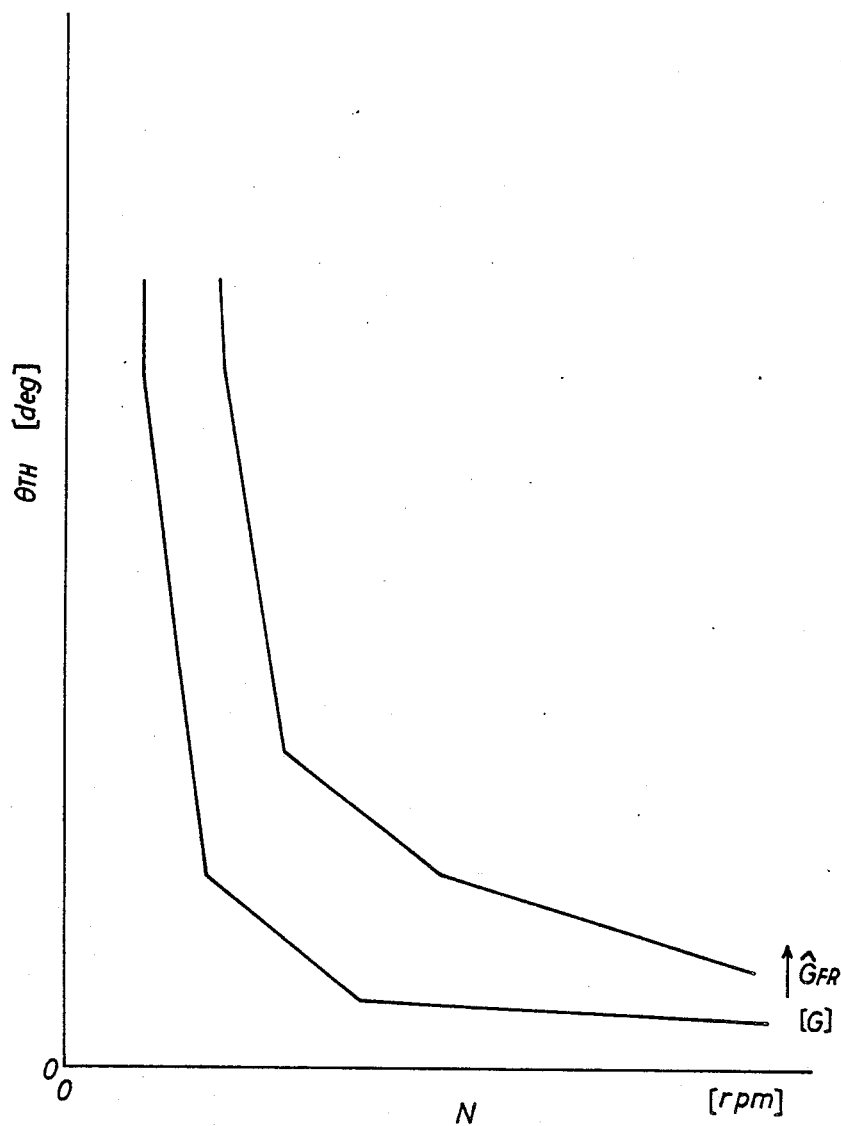
FIG. 25 is a graph showing a map for determining the estimated longitudinal acceleration $\hat{G}FR$ based on the throttle opening $\theta TH$ and a rotational speed N of an internal combustion engine.
Figure 26:
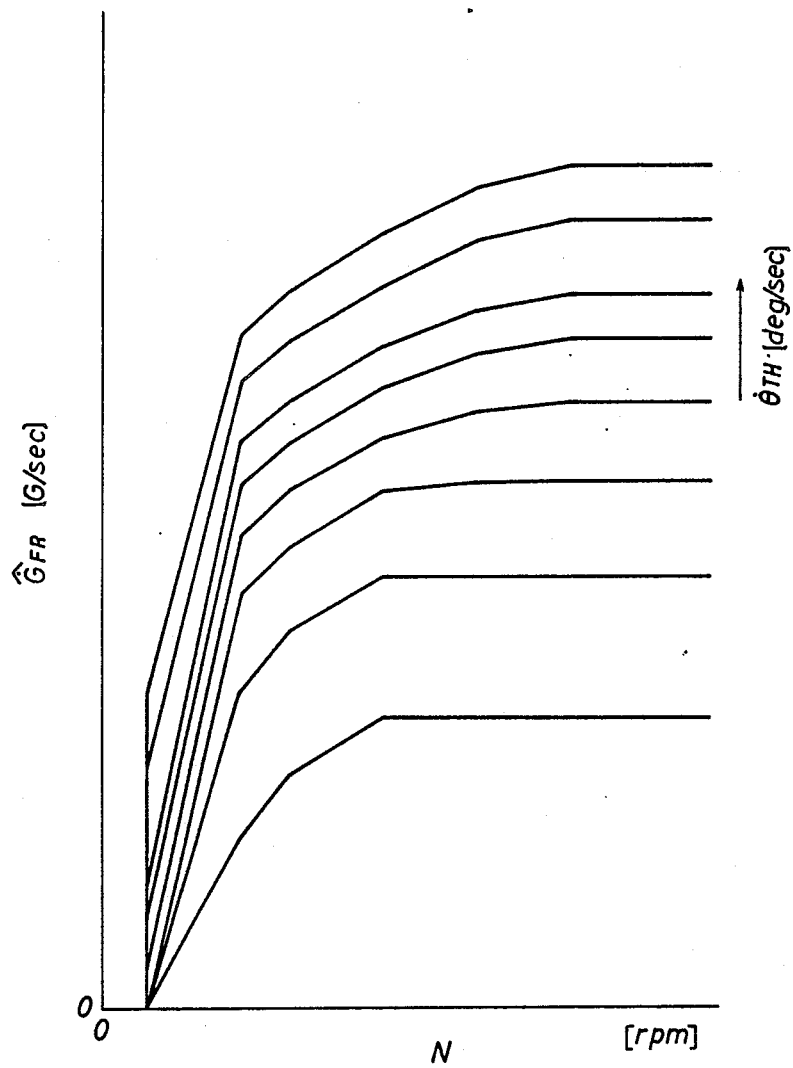
FIG. 26 is a graph showing a map for determining the estimated longitudinal accelerating rate $\hat{G}FR$ based on the throttle opening speed $\dot{\theta}TH$ and the engine speed N.
Figure 27:
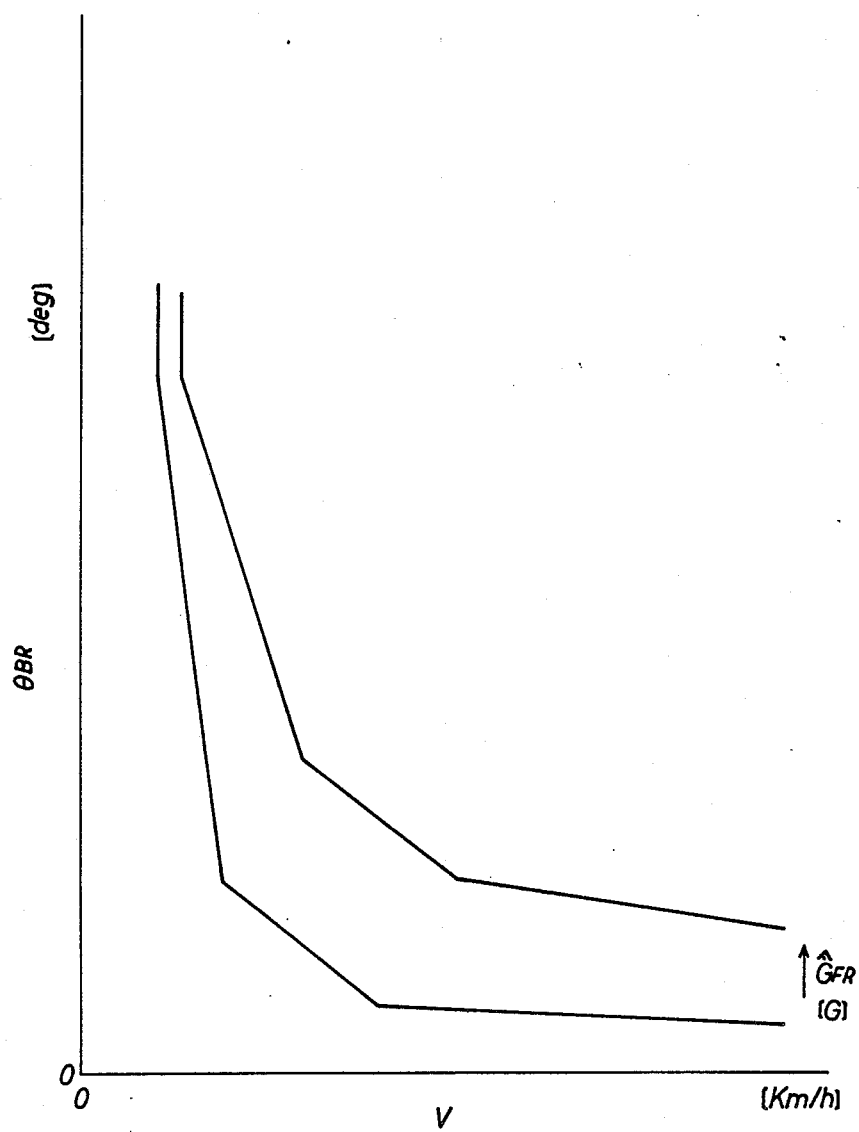
FIG. 27 is a graph showing a map for determining the estimated longitudinal acceleration $\hat{G}FR$ based on a brake pedal displacement $\theta BR$ and the vehicle speed V.
Figure 28:
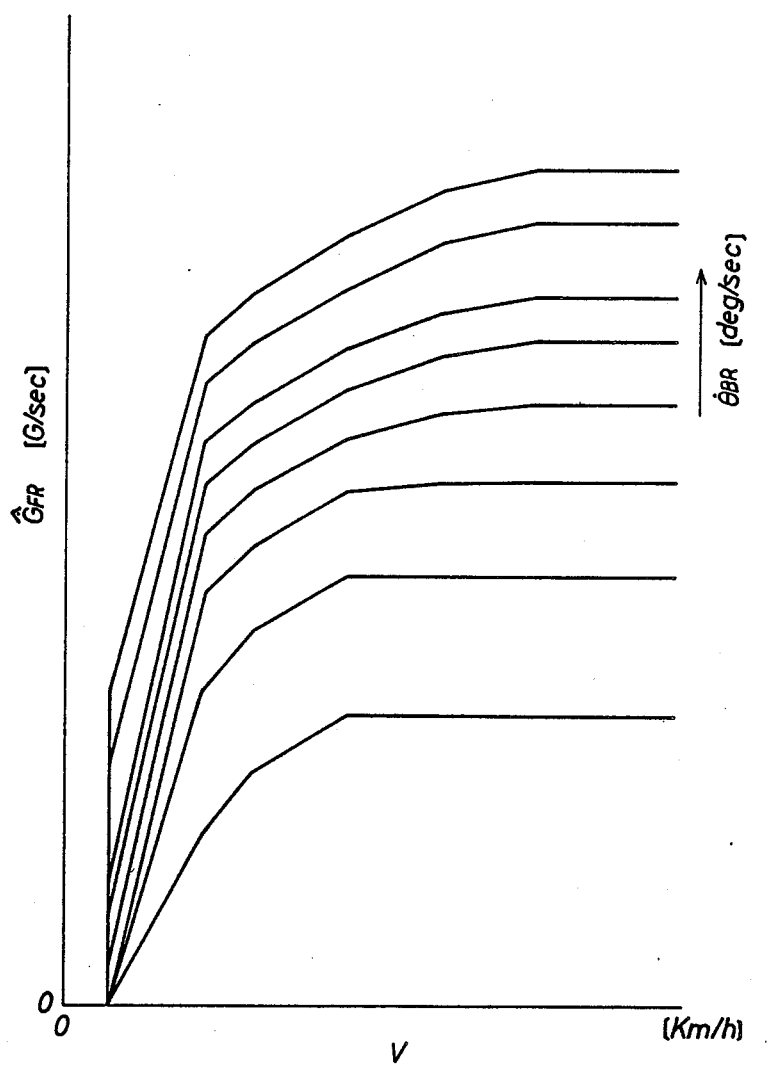
FIG. 28 is a graph showing a map for determining the estimated longitudinal accelerating rate $\hat{G}FR$ based on a braking speed $\dot{\theta}BR$ and the vehicle speed V.

When the steering wheel is gently operated as shown in FIG. 22A, a difference between the expected lateral acceleration GRLM (two-dot chain line) and the actual lateral acceleration GRL (solid line) results as shown in FIG. 22B. FIG. 22C shows that the valve energizing signal fed to an appropriate valve has the cycle time of 100 msec with its duty ratio varying every cycle according to the calculation results explained so far. As shown in FIG. 22D, the pressures of the main air chambers 4FL, 4FR, 4RL and 4RR of the suspensions 1FL, 1FR, 1RL and 1RR are gradually increased in response to the increase in the expected lateral acceleration GRLM. As a result, the roll angle can be minimized as shown in FIG. 22E so that maneuverability and stability of the vehicle are improved.

When a lateral acceleration is expected to develop, i.e., roll of the body is expected to occur, the roll displacement XR is filtered with the filtering constant K10 corresponding to a higher threshold frequency, which enhances quick response of the attitude control. When no such attitude change is expected, the filtering constant is set at K1 corresponding to a lower threshold frequency, which prevents hunting of the attitude control due to high frequency component of the displacement signal. The pitch displacement XP is similarly treated to enhance responsiveness at necessary times and to prevent hunting otherwise.

In the present embodiment, since the expected lateral acceleration GRLM is calculated based on not only the estimated lateral acceleration $\hat{G}RL$ but also on the estimated lateral accelerating rate $\hat{\dot{G}}RL$, attitude control can be started just before the vehicle attitude actually changes. Namely, accurate feedforward control can be realized. It is of course possible to calculate the expected lateral acceleration GRLM based solely on either the estimated acceleration $\hat{G}RL$ or the estimated lateral accelerating rate $\hat{\dot{G}}RL$. Alternatively, it is possible to calculate the expected acceleration GRLM directly from the actual lateral acceleration GRL and its differential $\dot{G}RL$, without utilizing the estimated lateral acceleration $\hat{G}RL$ and the estimated lateral accelerating rate $\hat{\dot{G}}RL$.

The expected acceleration GRLM or GFRM is effective in preventing the roll or pitch (squat or dive) of the body. In respective attitude control, the switching of the values of the filtering constant KFR or KFP is executed according to the object of the attitude control. When the attitude control is totally executed by combining the roll control, squat control and dive control, it is possible to switch values in only one of the filtering constants KFR and KFP.

In the above embodiment, the height sensors 80, 82, 84 and 86 correspond to the height detection means M1; ECU executing step 410 corresponds to the roll detection means M2; ECU executing step 600 corresponds to the low-pass filtering means M3; the brake switch 87, throttle sensor 88, steering sensor 90 and the speed sensor 93 correspond to the driving state detection means M4; ECU executing steps 420-590 correspond to the threshold changing means M5; ECU executing step 610 corresponds to the target determination means M6; ECU executing steps 620-660 correspond to the attitude control means M7; and the air circuit AC and the ECU executing steps 103-350 and 700-900 correspond to the fluid flow control means M8.

While the invention has been particularly shown and described with reference to a preferred embodiment, it will be understood by those skilled in the art that various other changes in form and detail may be made without departing from the spirit and scope of the invention.

What is claimed is:

1. An electronic controlled fluid suspension system for a vehicle comprising:
a fluid suspension provided for each of a plurality of wheels of the vehicle;
a height detection means provided for each of the plurality of wheels for detecting a height of a body of the vehicle at said each wheel and for generating a height signal;
a roll detection means responsive to the height signals for generating a roll signal representing a roll of the body;
a low-pass filtering means for passing only a component of the roll signal having a frequency lower than a threshold frequency;
a driving state detection means for detecting driving parameters that affect a lateral acceleration of the body;
a threshold changing means responsive to the detected driving parameters for changing the threshold frequency of the low-pass filtering means to a higher value when the body is expected to develop a roll;
a target determination means for determining a target roll signal;
an attitude control means for generating a control amount in order to feedback-control the roll signal filtered by the low-pass filtering means to approach the target roll signal; and
a fluid flow control means responsive to the control amount for controlling fluid flow to and from each of the fluid suspensions.

2. The electronic controlled fluid suspension system according to claim 1, wherein:
the driving state detection means comprises a means for detecting a running speed of the vehicle and a means for detecting a steering angle of the vehicle; and
the threshold changing means changes the threshold frequency when the detected running speed is greater than a reference speed and the detected steering angle is greater than a reference angle.

3. The electronic controlled fluid suspension system according to claim 2, wherein:
the electronic controlled fluid suspension system further comprises a lateral acceleration detection means for detecting said lateral acceleration of the body; and
the target determination means comprises a means for determining the target roll signal according to the detected lateral acceleration, and a means for setting the target roll signal at zero when the detected lateral acceleration is greater than a predetermined value.

4. An electronic controlled fluid suspension system for a vehicle comprising:
a fluid suspension provided for each of a plurality of wheels of the vehicle;
a height detection means provided for each of the plurality of wheels for detecting a height of a body of the vehicle at said each wheel and for generating a height signal;
a pitch detection means responsive to the height signals for generating a pitch signal representing a pitch of the body;
a low-pass filtering means for passing only a component of the pitch signal having a frequency lower than a threshold frequency;
a driving state detection means for detecting driving parameters that affect a longitudinal acceleration of the body;
a threshold changing means responsive to the detected driving parameters for changing the threshold frequency of the low-pass filtering means to a higher value when the body is expected to develop a pitch;

a target determination means for determining a target pitch signal;

an attitude control means for generating a control amount in order to feedback-control the pitch signal filtered by the low-pass filtering means to approach the target pitch signal; and a fluid flow control means responsive to the control amount for controlling fluid flow to and from each of the fluid suspensions.

5. The electronic controlled fluid suspension system according to claim 4, wherein:

the driving state detection means comprises a means for detecting an operation of a brake pedal of the vehicle and a means for detecting a throttle valve opening speed of an internal combustion engine of the vehicle; and the threshold changing means changes the threshold frequency when the brake pedal is detected to be operated or the detected throttle valve opening speed is greater than a reference opening speed.

6. The electronic controlled fluid suspension system according to claim 5, wherein:

the electronic controlled fluid suspension system further comprises a longitudinal acceleration detection means for detecting said longitudinal acceleration of the body; and the target determination means comprises a means for determining the target pitch signal according to the detected longitudinal acceleration, and a means for setting the target pitch signal at zero when the detected longitudinal acceleration is greater than a predetermined value.

* * * * *

UNITED STATES PATENT AND TRADEMARK OFFICE
CERTIFICATE OF CORRECTION

PATENT NO. : 4,897,776
DATED : JANUARY 30, 1990
INVENTOR(S) : SHINGO URABABA ET AL

It is certified that error appears in the above-identified patent and that said Letters Patent is hereby corrected as shown below:

TITLE PAGE:

[30] Foreign Application Priority Data

The third Priority Document should read as follows:

Jul. 28, 1988 [JP]  Japan ............. 63-100380[U]

Signed and Sealed this

Sixteenth Day of July, 1991

Attest:

HARRY F. MANBECK, JR.

*Attesting Officer*  *Commissioner of Patents and Trademarks*